US012675910B2

(12) United States Patent
Imai

(10) Patent No.: US 12,675,910 B2
(45) Date of Patent: Jul. 7, 2026

(54) INFORMATION PROCESSING SYSTEM, INFORMATION PROCESSING METHOD, AND RECORDING MEDIUM FOR DETERMINING WHETHER A USER IS A LIVING BODY

(71) Applicant: NEC Corporation, Tokyo (JP)

(72) Inventor: Haruki Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 18/272,564

(22) PCT Filed: Apr. 28, 2021

(86) PCT No.: PCT/JP2021/017010
§ 371 (c)(1),
(2) Date: Jul. 14, 2023

(87) PCT Pub. No.: WO2022/230117
PCT Pub. Date: Nov. 3, 2022

(65) Prior Publication Data
US 2024/0078704 A1      Mar. 7, 2024

(51) Int. Cl.
*G06T 7/77*          (2017.01)
*G06F 3/01*          (2006.01)

(52) U.S. Cl.
CPC ................ *G06T 7/77* (2017.01); *G06F 3/012* (2013.01); *G06F 3/013* (2013.01); *G06T 2207/30201* (2013.01)

(58) Field of Classification Search
CPC ......................... G06T 7/77; G06T 2207/30201

USPC .......................................................... 382/107
See application file for complete search history.

(56) References Cited

U.S. PATENT DOCUMENTS

| | | | |
|---|---|---|---|
| 2007/0071321 A1 | 3/2007 | Ota | |
| 2014/0037156 A1* | 2/2014 | Cavallini | G06F 18/22 |
| | | | 382/118 |
| 2014/0310803 A1 | 10/2014 | Irie | |
| 2017/0228586 A1 | 8/2017 | Morishita | |

(Continued)

FOREIGN PATENT DOCUMENTS

| | | |
|---|---|---|
| CN | 1940911 A | 4/2007 |
| CN | 107346422 A | 11/2017 |

(Continued)

OTHER PUBLICATIONS

Extended European Search Report for EP Application No. 21939278. 4, dated on Apr. 26, 2024.

(Continued)

*Primary Examiner* — Gabriel I Garcia
(74) *Attorney, Agent, or Firm* — Sughrue Mion, PLLC

(57) ABSTRACT

An information processing system includes: a face direction acquisition unit that obtains a face direction of a user; a gaze direction acquisition unit that obtains a gaze direction of the user; a determination unit that determines whether or not the user is a living body, on the basis of a difference between the face direction and the gaze direction, when an angle of the face direction is greater than or equal to a predetermined threshold; and an output unit that outputs a result of the determination. According to such an information processing system, it is possible to accurately determine whether or not the user is a living body.

8 Claims, 20 Drawing Sheets

(56)                    References Cited

U.S. PATENT DOCUMENTS

2019/0135178 A1      5/2019  Shimizu
2020/0320282 A1*    10/2020  Boic ..................... G06V 40/45

FOREIGN PATENT DOCUMENTS

| CN | 111160251 | A | 5/2020 | | |
| CN | 112699857 | A | 4/2021 | | |
| EP | 2546782 | A1 | 1/2013 | | |
| EP | 2546782 | B1 | 6/2014 | | |
| JP | 2007-148968 | A | 6/2007 | | |
| JP | 2008-015800 | A | 1/2008 | | |
| JP | 2014-206932 | A | 10/2014 | | |
| JP | 2016-009453 | A | 1/2016 | | |
| JP | 2017-142859 | A | 8/2017 | | |
| JP | WO2018008575 | A1 * | 4/2019 | ....... | G08B 13/19613 |
| JP | 2020-194608 | A | 12/2020 | | |
| WO | 2016/059786 | A1 | 4/2016 | | |

OTHER PUBLICATIONS

International Search Report for PCT Application No. PCT/JP2021/017010, mailed on Jul. 20, 2021.
IN Examination Report for IN Application No. 202317070136, mailed on Sep. 25, 2025.
CN Office Action for CN Application No. 202180097472.1, mailed on Nov. 3, 2025 with English Translation.
"Open Your Eyes", Guangxi Science and Technology Association, Guangxi Science and Technology Press, Dec. 31, 2018, p. 45.
CN Office Action for CN Application No. 202180097472.1, mailed on Jun. 23, 2025 with English Translation.
CN Office Action for CN Application No. 202180097472.1, mailed on Jan. 30, 2026 with English Translation.

* cited by examiner

10: INFORMATION PROCESSING SYSTEM

FOUR-DIMENSIONAL
VECTOR

INFORMATION PROCESSING SYSTEM, INFORMATION PROCESSING METHOD, AND RECORDING MEDIUM FOR DETERMINING WHETHER A USER IS A LIVING BODY

This application is a National Stage Entry of PCT/JP2021/017010 filed on Apr. 28, 2021, the contents of all of which are incorporated herein by reference, in their entirety.

TECHNICAL FIELD

The present disclosure relates to technical fields of an information processing system, an information processing method, and a recording medium that make a determination about a user.

BACKGROUND ART

A known system of this type performs a spoofing detection in biometric authentication. For example, Patent Literature 1 discloses that authentication is failed when an angle of a detected face direction is greater than or equal to a predetermined angle. Patent Literature 2 discloses that a positional relationship between an estimated line of sight and a display is analyzed to determine whether or not an image is a spoof image. Patent Literature 3 discloses that authentication is determined to be correctly performed when a detected gaze direction is an authentication permitted gaze direction. Patent Literature 4 discloses that a possibility of a spoof face indicated by a face image column is determined on the basis of information about a time change in a line of sight.

CITATION LIST

Patent Literature

Patent Literature 1: JP2007-148968A
Patent Literature 2: JP2008-015800A
Patent Literature 3: JP2017-142859A
Patent Literature 4: JP2020-194608A

SUMMARY

Technical Problem

This disclosure aims to improve the techniques/technologies disclosed in Citation List.

Solution to Problem

An information processing system according to an example aspect of this disclosure includes: a face direction acquisition unit that obtains a face direction of a user; a gaze direction acquisition unit that obtains a gaze direction of the user; a determination unit that determines whether or not the user is a living body, on the basis of a difference between the face direction and the gaze direction, when an angle of the face direction is greater than or equal to a predetermined threshold; and an output unit that outputs a result of the determination.

An information processing system according to another example aspect of this disclosure includes: a face direction acquisition unit that obtains a face direction of a user; a gaze direction acquisition unit that obtains a gaze direction of the user; a calculation unit that calculates a score indicating a possibility that the user is a living body, from a difference between the face direction and the gaze direction; a correction unit that corrects the score in accordance with an angle of the face direction; a determination processing unit that determines whether or not the user is a living body, on the basis of the corrected score; and an output unit that outputs a result of the determination.

An information processing method according to an example aspect of this disclosure includes: obtaining a face direction of a user; obtaining a gaze direction of the user; determining whether or not the user is a living body, on the basis of a difference between the face direction and the gaze direction, when an angle of the face direction is greater than or equal to a predetermined threshold; and outputting a result of the determination.

A recording medium according to an example aspect of this disclosure is a recording medium on which a computer program that allows a computer to execute an information processing method is recorded, the information processing method including: obtaining a face direction of a user; obtaining a gaze direction of the user; determining whether or not the user is a living body, on the basis of a difference between the face direction and the gaze direction, when an angle of the face direction is greater than or equal to a predetermined threshold; and outputting a result of the determination.

3

Figure 13:
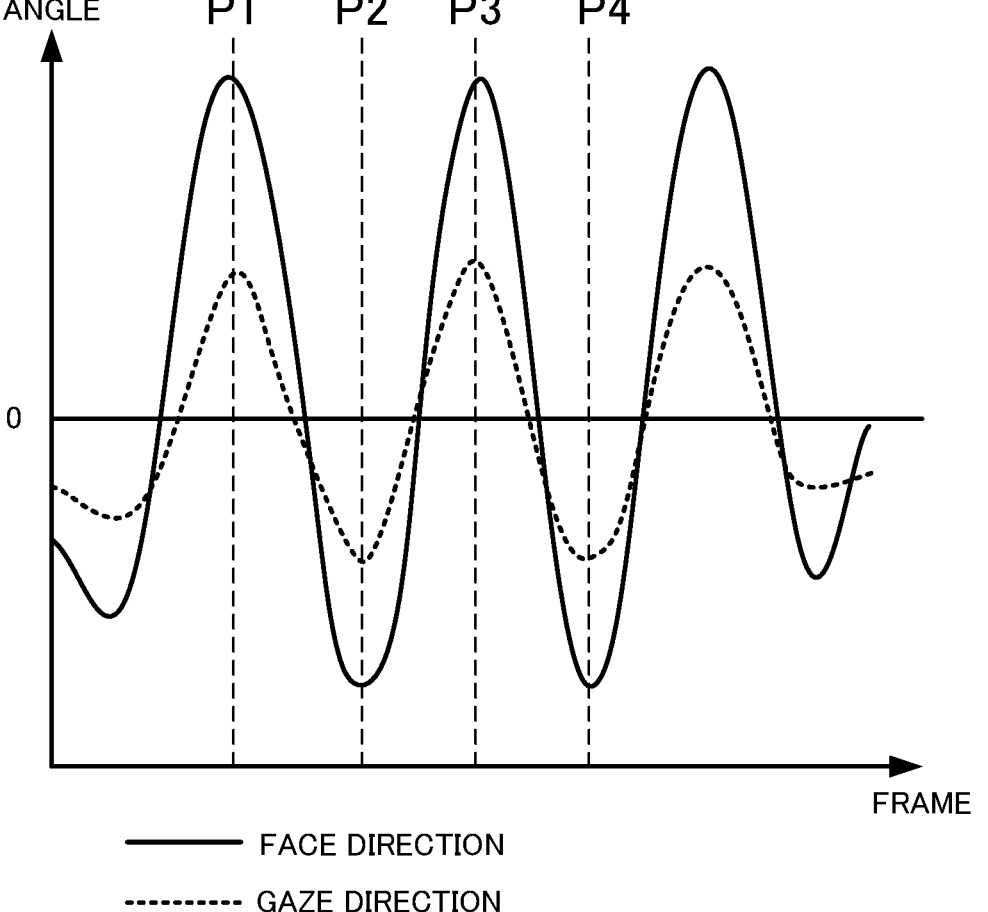

FIG. 13 is a graph illustrating an acquisition timing of a face direction and a gaze direction by an information processing system according to a sixth example embodiment.

Figure 14:
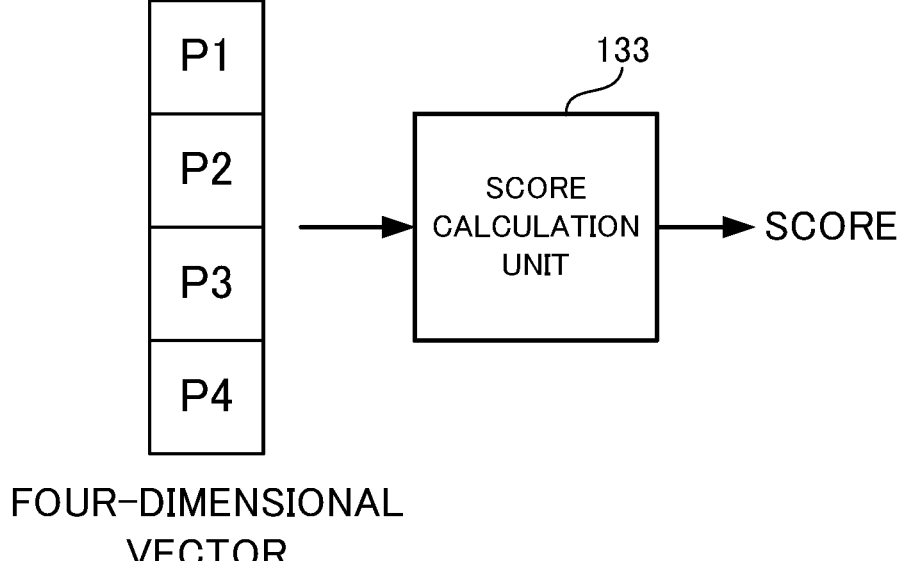

FIG. 14 is a conceptual diagram illustrating a method of calculating the score by the information processing system according to the sixth example embodiment.

Figure 15:
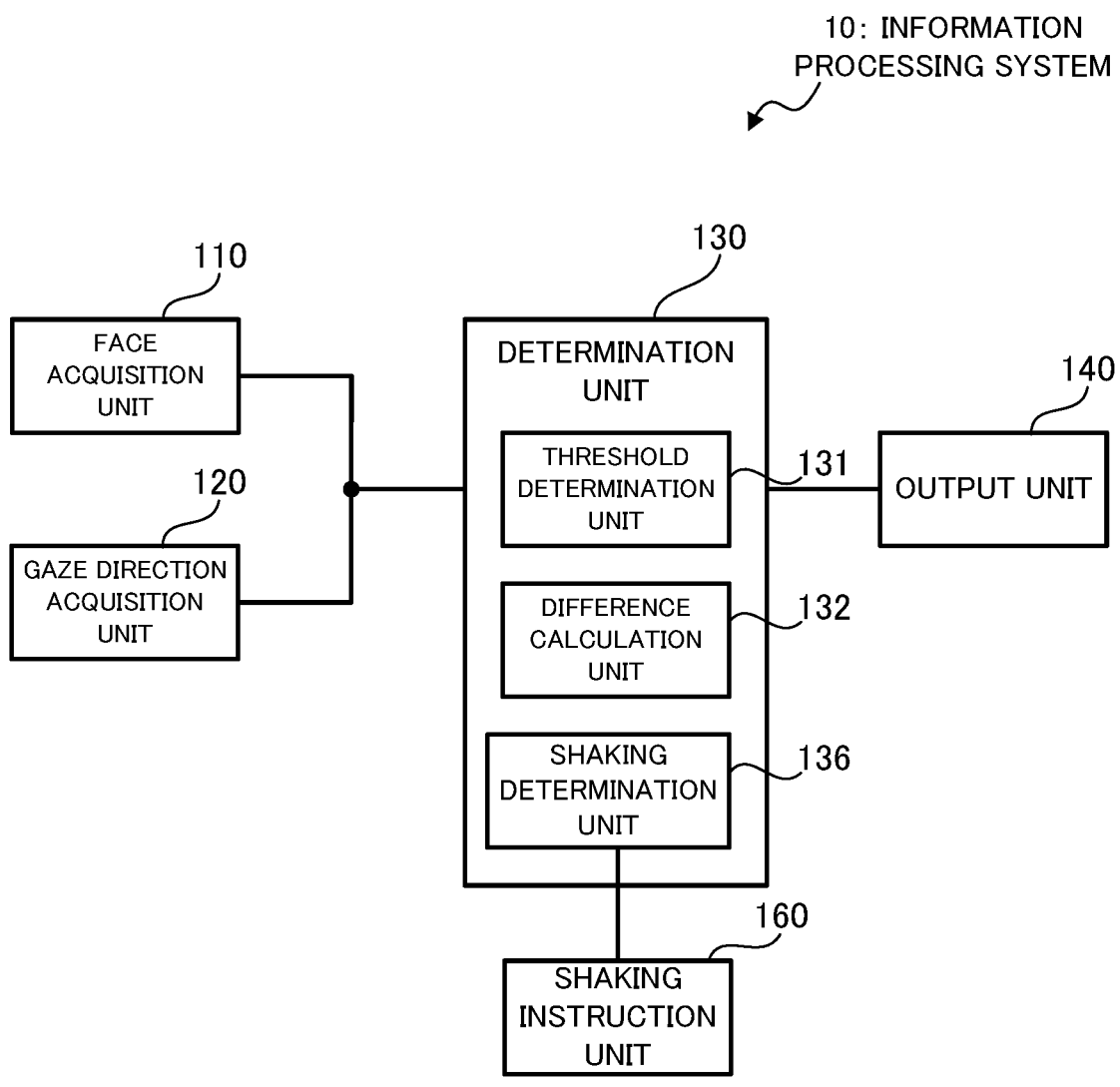

FIG. 15 is a block diagram illustrating a functional configuration of an information processing system according to a seventh example embodiment.

Figure 16:
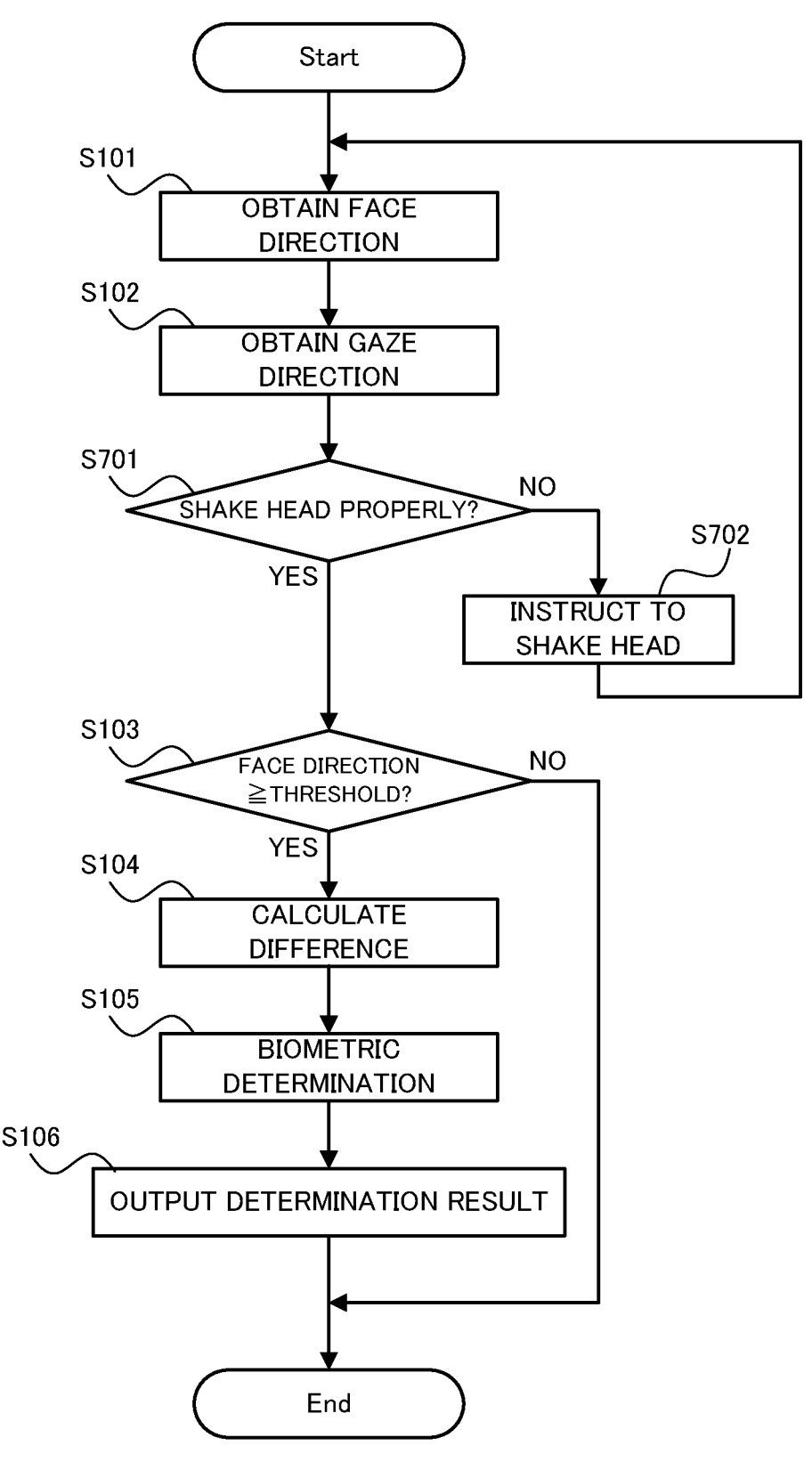

FIG. 16 is a flowchart illustrating a flow of operation of the information processing system according to the seventh example embodiment.

Figure 17:
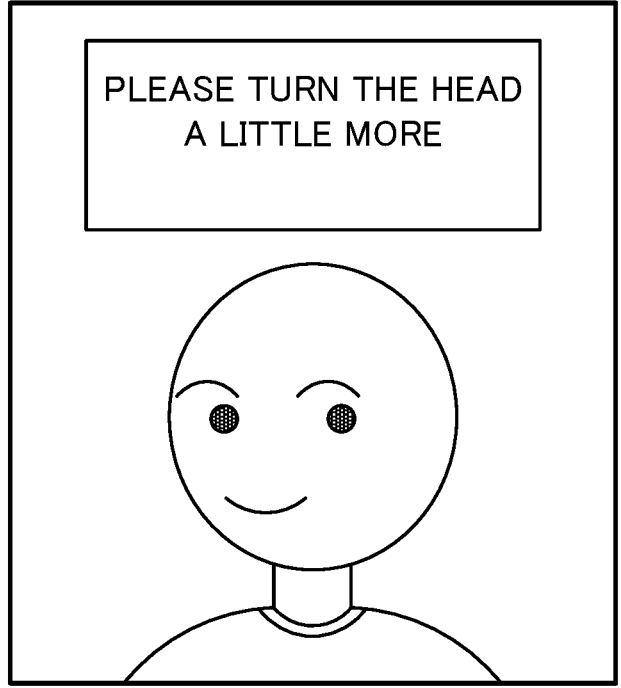

FIG. 17 is version 1 of a diagram illustrating a display example by the information processing system according to the seventh example embodiment.

Figure 18:
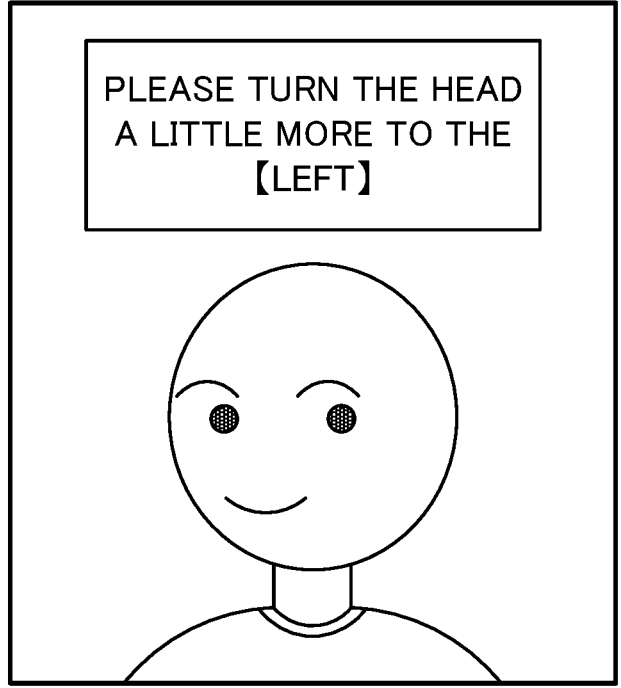

FIG. 18 is version 2 of a diagram illustrating a display example by the information processing system according to the seventh example embodiment.

Figure 19:
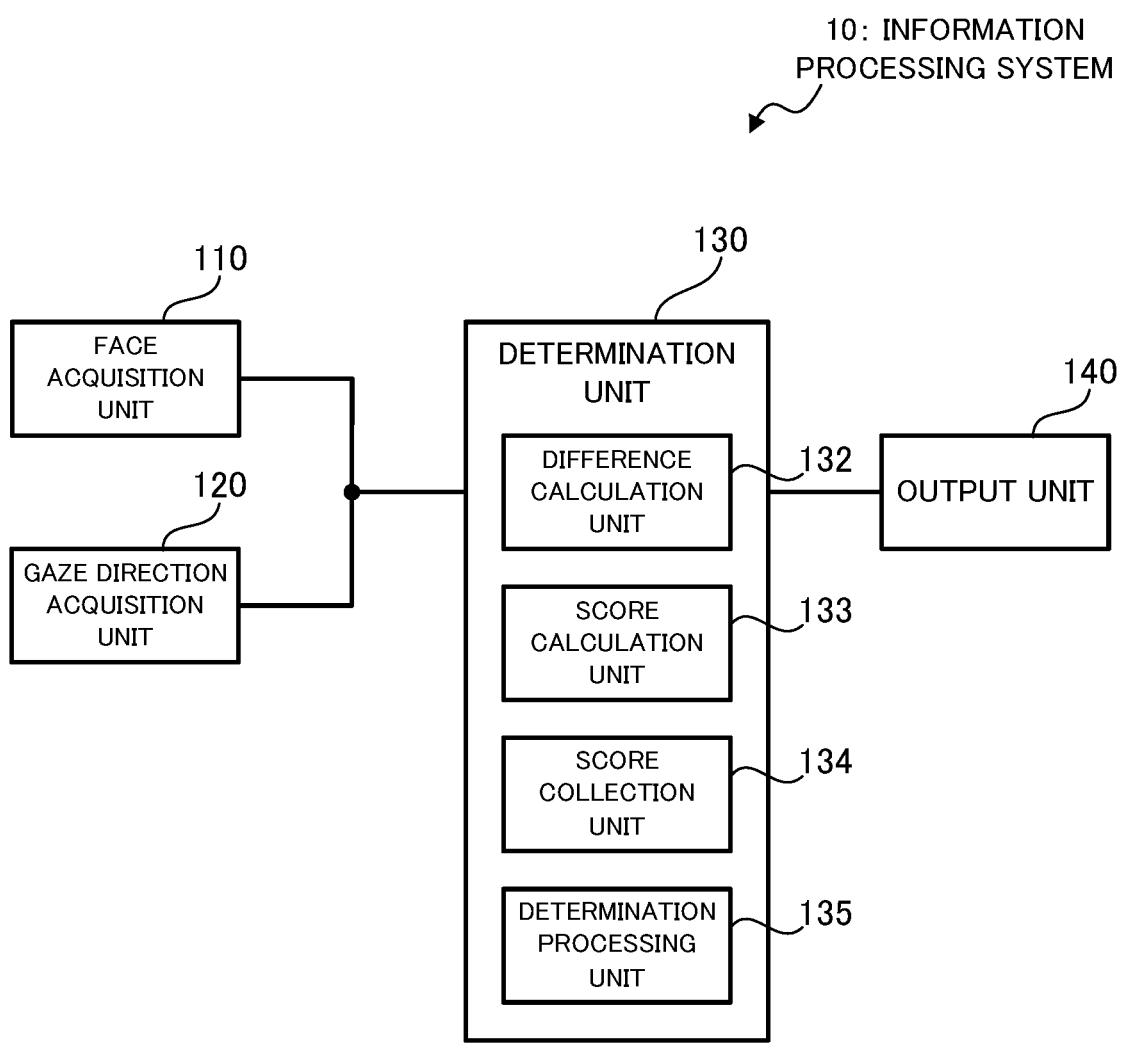

FIG. 19 is a block diagram illustrating a functional configuration of an information processing system according to an eighth example embodiment.

Figure 20:
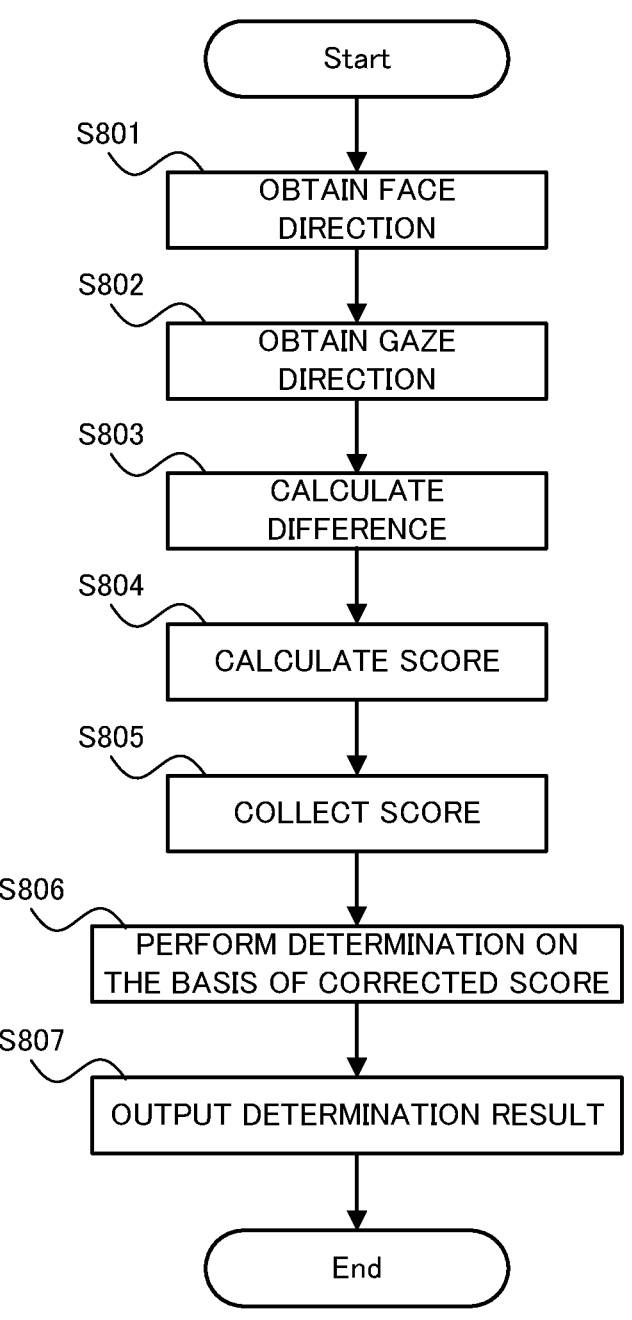

FIG. 20 is a flowchart illustrating a flow of operation of the information processing system according to the eighth example embodiment.

DESCRIPTION OF EXAMPLE EMBODIMENTS

Hereinafter, an information processing system, an information processing method, and a recording medium according to example embodiments will be described with reference to the drawings.

First Example Embodiment

An information processing system according to a first example embodiment will be described with reference to FIG. 1 to FIG. 3.
(Hardware Configuration)

First, a hardware configuration of an information processing system 10 according to the first example embodiment will be described with reference to FIG. 1. FIG. 1 is a block diagram illustrating the hardware configuration of the information processing system according to the first example embodiment.

Figure 1:
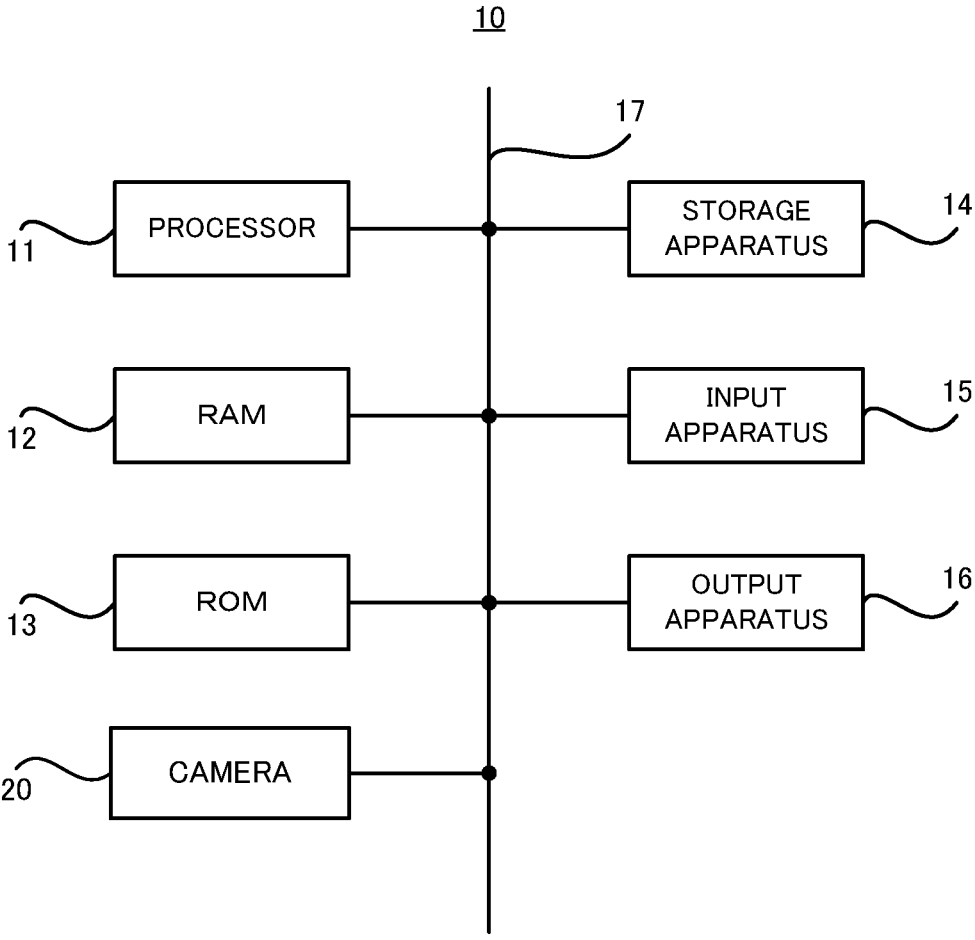
FIG. 1 is a block diagram illustrating a hardware configuration of an information processing system according to a first example embodiment.

As illustrated in FIG. 1, the information processing system 10 according to the first example embodiment includes a processor 11, a RAM (Random Access Memory) 12, a ROM (Read Only Memory) 13, and a storage apparatus 14. The information processing system 10 may further include an input apparatus 15, an output apparatus 16, and a camera 20. The processor 11, the RAM 12, the ROM 13, the storage apparatus 14, the input apparatus 15, the output apparatus 16, and the camera 20 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium by using a not-illustrated recording medium reading apparatus. The processor 11 may obtain (i.e., read) a computer program from a not-illustrated apparatus disposed outside the information processing system 10, through a network interface. The processor 11 controls the RAM 12, the storage apparatus 14, the input apparatus 15, and the output apparatus 16 by executing the read computer program. Especially in this example embodiment, when the processor 11 executes the read computer program, a functional block for determining whether or not a user is a living body is realized or implemented in the processor 11.

The processor 11 may be configured as, for example, a CPU (Central Processing Unit), a GPU (Graphics Processing Unit), a FPGA (field-programmable gate array), a DSP (Demand-Side Platform) or an ASIC (Application Specific Integrated Circuit). The processor 11 may use one of them, or may use a plurality of them in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that is stored for a long term by the information processing system 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from the user of the information processing system 10. The input apparatus 15 may include, for example, at least one of a keyboard, a mouse, and a touch panel.

The output apparatus 16 is an apparatus that outputs information about the information processing system 10 to the outside. For example, the output apparatus 16 may be a display apparatus (e.g., a display) that is configured to display the information about the information processing system 10.

The camera 20 is a camera installed at a position where an image of the user (e.g., an image including a face of the user) can be captured. The camera 20 may be a camera for capturing a still image or a camera for capturing a video. The camera 20 may be configured as a visible light camera or as a near infrared camera.
(Functional Configuration)

Next, a functional configuration of the information processing system 10 according to the first example embodiment will be described with reference to FIG. 2. FIG. 2 is a block diagram illustrating the functional configuration of the information processing system according to the first example embodiment.

Figure 2:
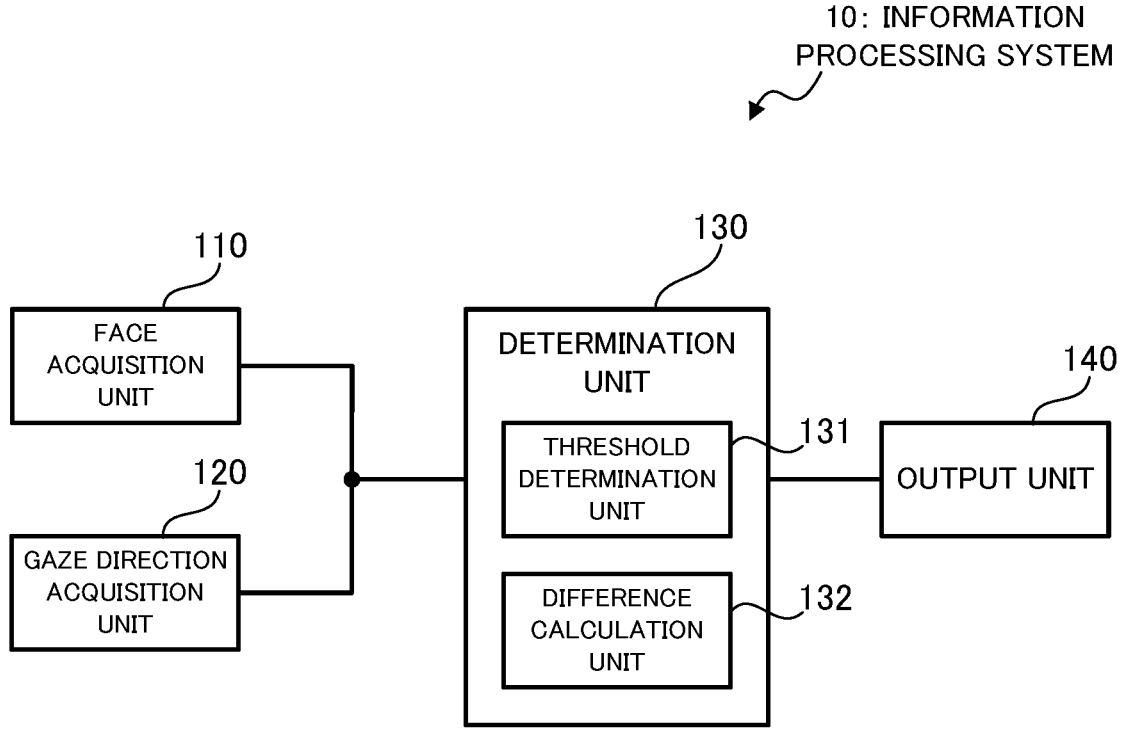
FIG. 2 is a block diagram illustrating a functional configuration of the information processing system according to the first example embodiment.

As illustrated in FIG. 2, the information processing system 10 according to the first example embodiment includes, as processing blocks for realizing the functions thereof, a face direction acquisition unit 110, a gaze direction acquisition unit 120, a determination unit 130, and an output unit 140. Each of the face direction acquisition unit 110, the gaze direction acquisition unit 120, the determination unit 130, and the output unit 140 may be realized or implemented by the processor 11 (see FIG. 1), for example. The output unit 140 may be configured to perform output thereof through the output apparatus 16 (see FIG. 1).

The face direction acquisition unit 110 is configured to obtain a face direction of the user (i.e., a direction in which the face of the user is directed). The face direction of the user may be obtained as information indicating by how many degrees the face direction is deviated from a reference direction, for example. Specifically, for example, if the front is a direction in which the user faces the camera, the face direction of the user may be obtained as information indicating by how many degrees the face direction is deviated from the front. The face direction acquisition unit 110 may be configured to obtain (estimate) the face direction of the user from a face image of the user, for example. A detailed description of a specific method of obtaining the face direction from the image will be omitted here because the existing techniques/technologies can be adopted to the method as appropriate.

The gaze direction acquisition unit 120 is configured to obtain a gaze direction of the user (i.e., a direction in which a line of sight of the user is directed). Similar to the face direction, the gaze direction of the user may be obtained as information indicating by how many degrees the gaze direction is deviated from a reference direction, for example. Specifically, for example, if the front is a direction in which the user faces the camera, the gaze direction of the user may be obtained as information indicating by how many degrees the gaze direction is deviated from the front. The gaze direction acquisition unit 120 may be configured to obtain (estimate) the gaze direction of the user from the face image of the user (more specifically, an image including around the eyes), for example. A detailed description of a specific method of obtaining the gaze direction from the image will be omitted here because the existing techniques/technologies can be adopted to the method as appropriate.

The determination unit 130 is configured to determine whether or not the user is a living body (in other words, whether or not the user performs spoofing), on the basis of the face direction of the user obtained by the face direction acquisition unit 110 and the gaze direction of the user obtained by the gaze direction acquisition unit 120. The determination unit 130 includes a threshold determination unit 131, and a difference calculation unit 132.

The threshold determination unit 131 is configured to determine whether or not an angle of the face direction of the user obtained by the face direction acquisition unit 110 is greater than or equal to a predetermined threshold. The "predetermined threshold" here is a threshold for determining that the angle of the face direction is large (i.e., the user turns the head to the side) enough to determine whether or not the user is a living body, and an optimum value may be obtained by pre-experiments, simulation, or the like. Furthermore, the predetermined threshold may be set as a threshold that allows a determination of not only an extent of the face direction of the user, but also whether or not the face direction is a predetermined direction. For example, when the user is instructed to look to the right, the predetermined threshold may be set as a threshold that allows a determination that the user is looking to the right, not in another direction. The determination unit 130 is configured to determine whether or not the user is a living body when it is determined in the threshold determination unit 131 that the angle of the face direction of the user is greater than or equal to the predetermined threshold. In other words, the determination unit 130 is configured not to determine whether or not the user is a living body when it is determined that the angle of the face direction of the user is less than the predetermined threshold.

The difference calculation unit 132 is configured to calculate a difference between the face direction of the user obtained by the face direction acquisition unit 110 and the gaze direction of the user obtained by the gaze direction acquisition unit 120. The determination unit 130 is configured to determine whether or not the user is a living body, on the basis of the difference between the face direction and the gaze direction. A specific information processing method using the difference between the face direction and the gaze direction will be described in detail in another example embodiment described later.

The output unit 140 is configured to output a determination result of the determination unit 130 (i.e., a determination result of whether or not the user is a living body). An output aspect of the output unit 140 is not particularly limited, but the output unit 140 may be output an image by using a display, for example. Alternatively, the output unit 140 may output audio by using a speaker.

(Flow of Operation)

Next, a flow of operation of the information processing system 10 according to the first example embodiment will be described with reference to FIG. 3. FIG. 3 is a flowchart illustrating the flow of the operation of the information processing system according to the first example embodiment.

Figure 3:
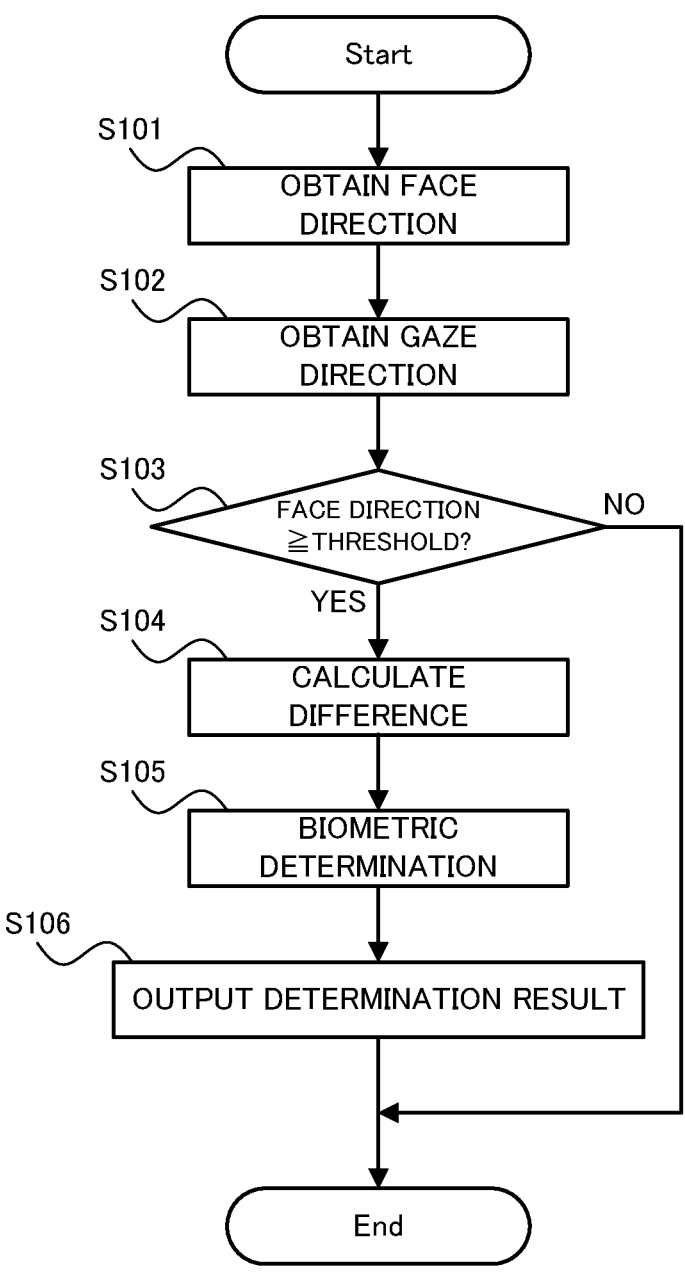
FIG. 3 is a flowchart illustrating a flow of operation of the information processing system according to the first example embodiment.

As illustrated in FIG. 3, in operation of the information processing system 10 according to the first example embodiment, first, the face direction acquisition unit 110 obtains the face direction of the user (step S101). In addition, the gaze direction acquisition unit 120 obtains the gaze direction of the user (step S102). The steps S101 and S102 may be performed before and after each other, or may be performed at the same time in parallel.

Subsequently, the threshold determination unit 131 determines whether or not the angle of the face direction of the user obtained by the face direction acquisition unit 110 is greater than or equal to the predetermined threshold (step S103). When it is determined that the angle of the face direction of the user is not greater than or equal to the predetermined threshold (step S103: NO), the subsequent process is omitted and a series of processing steps is ended. On the other hand, when it is determined that the angle of the face direction of the user is greater than or equal to the predetermined threshold (step S103: YES), the difference calculation unit 132 calculates the difference between the face direction of the user and the gaze direction (step S104).

Subsequently, the determination unit 130 determines whether or not the user is a living body, on the basis of the difference between the face direction of the user and the gaze direction (step S105). Then, the output unit 140 outputs the determination result of the determination unit 130 (step S106).

(Technical Effect)

Next, a technical effect obtained by the information processing system 10 according to the first example embodiment will be described.

As described in FIG. 1 to FIG. 3, in the information processing system 10 according to the first example embodiment, when the angle of the face direction is greater than or equal to the predetermined threshold, it is determined whether or not the user is a living body. In this way, it is possible to prevent an erroneous determination result is outputted because the angle of the face direction of the user is small. It is therefore possible to determine whether or not the user is a living body with higher accuracy.

According to the studies of the inventor of the present application, it has been found that, when the angle of the face direction of the user is small, it is likely that the user is determined to be not a living body, even though the user is a living body. Therefore, if the determination is not performed when the angle of the face direction of the user is small, it is possible to prevent that the user is erroneously determined to be not a living body.

Second Example Embodiment

The information processing system 10 according to a second example embodiment will be described with reference to FIG. 4 and FIG. 5. The second example embodiment is partially different from the first example embodiment only in the configuration and operation, and may be the same as those of the first example embodiment in the other parts. For this reason, a part that is different from the first example embodiment described above will be described in detail below, and a description of other overlapping parts will be omitted as appropriate.

(Functional Configuration)

First, a functional configuration of the information processing system 10 according to the second example embodiment will be described with reference to FIG. 4. FIG. 4 is a block diagram illustrating the functional configuration of the information processing system according to the second example embodiment. In FIG. 4, the same components as those illustrated in FIG. 2 carry the same reference numerals.

Figure 4:
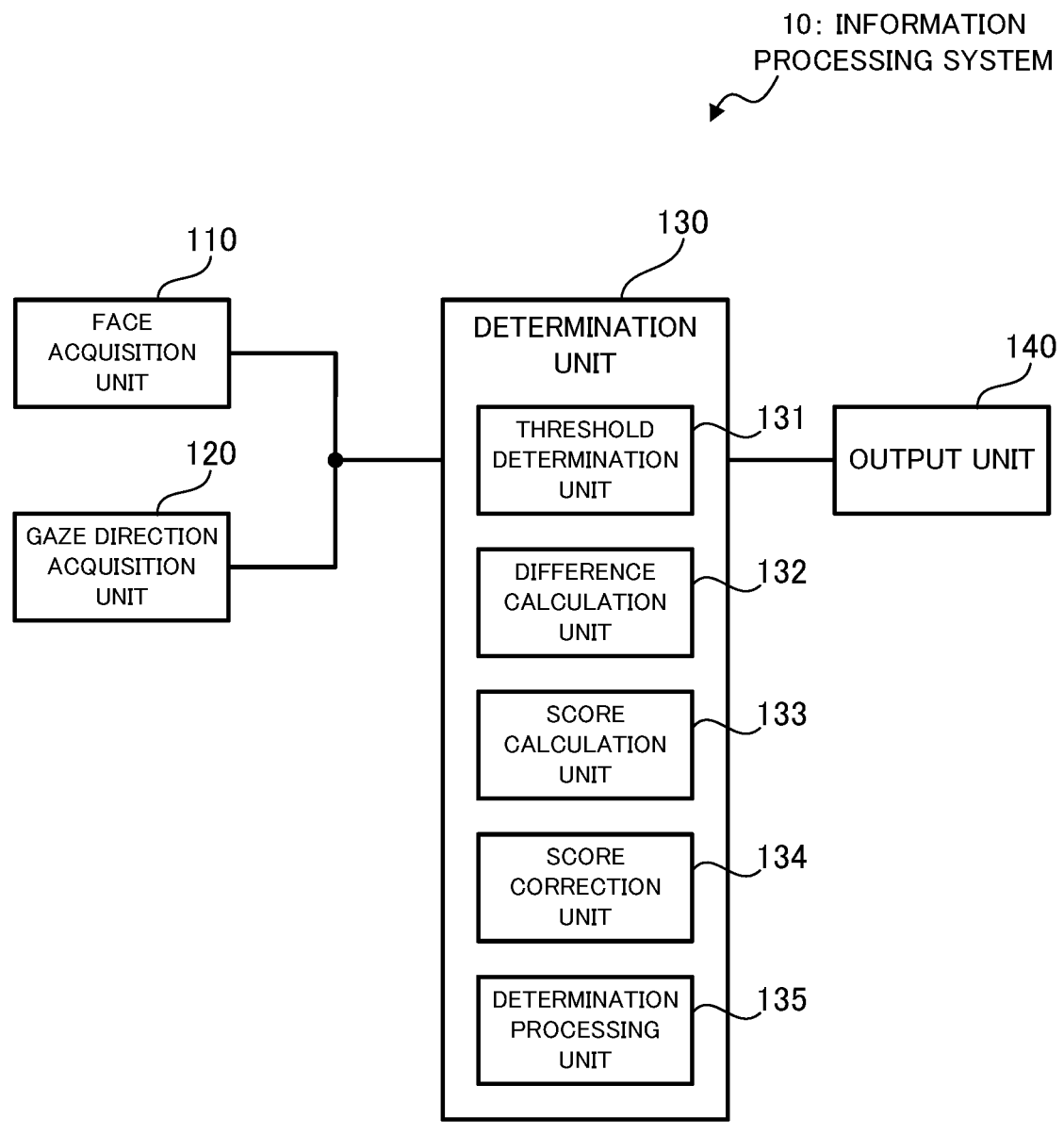
FIG. 4 is a block diagram illustrating a functional configuration of an information processing system according to a second example embodiment.

As illustrated in FIG. 4, the information processing system 10 according to the second example embodiment includes, as processing blocks for realizing the functions thereof, the face direction acquisition unit 110, the gaze direction acquisition unit 120, the determination unit 130, and the output unit 140. Especially, the determination unit 130 according to the second example embodiment includes the threshold determination unit 131, the difference calculation unit 132, a score calculation unit 133, a score correction unit 134, and a determination processing unit 135. That is, the determination unit 130 according to the second example embodiment further includes the score calculation unit 133, the score correction unit 134, and the determination processing unit 135, in addition to the configuration in the first example embodiment (see FIG. 2).

The score calculation unit 133 is configured to calculate a score indicating a possibility that the user is a living body, from the difference between the face direction and the gaze direction of the user. A higher score indicates that it is more likely that the user is a living body, for example. A specific calculation method of calculating the score will be described in detail in another example embodiment described later.

The score correction unit 134 is configured to correct the score calculated by score calculation unit 133, in accordance with the angle of the face direction of the user. The score is corrected such that the determination unit 130 hardly achieves an erroneous determination result. A specific correction method of correcting the score will be described in detail in another example embodiment described later.

The determination processing unit 135 is configured to determine whether or not the user is a living body, on the basis of the score corrected by the score correction unit 134. The determination processing unit 135 may store, for example, a determination threshold (i.e., a threshold for determining whether or not the user is a living body), and may compare the corrected score with the determination threshold to determine whether or not the user is a living body.

(Flow of Operation)

Next, a flow of operation of the information processing system 10 according to the second example embodiment will be described with reference to FIG. 5. FIG. 5 is a flowchart illustrating the flow of the operation of the information processing system according to the second example embodiment. In FIG. 5, the same steps as those illustrated in FIG. 3 carry the same reference numerals.

Figure 5:
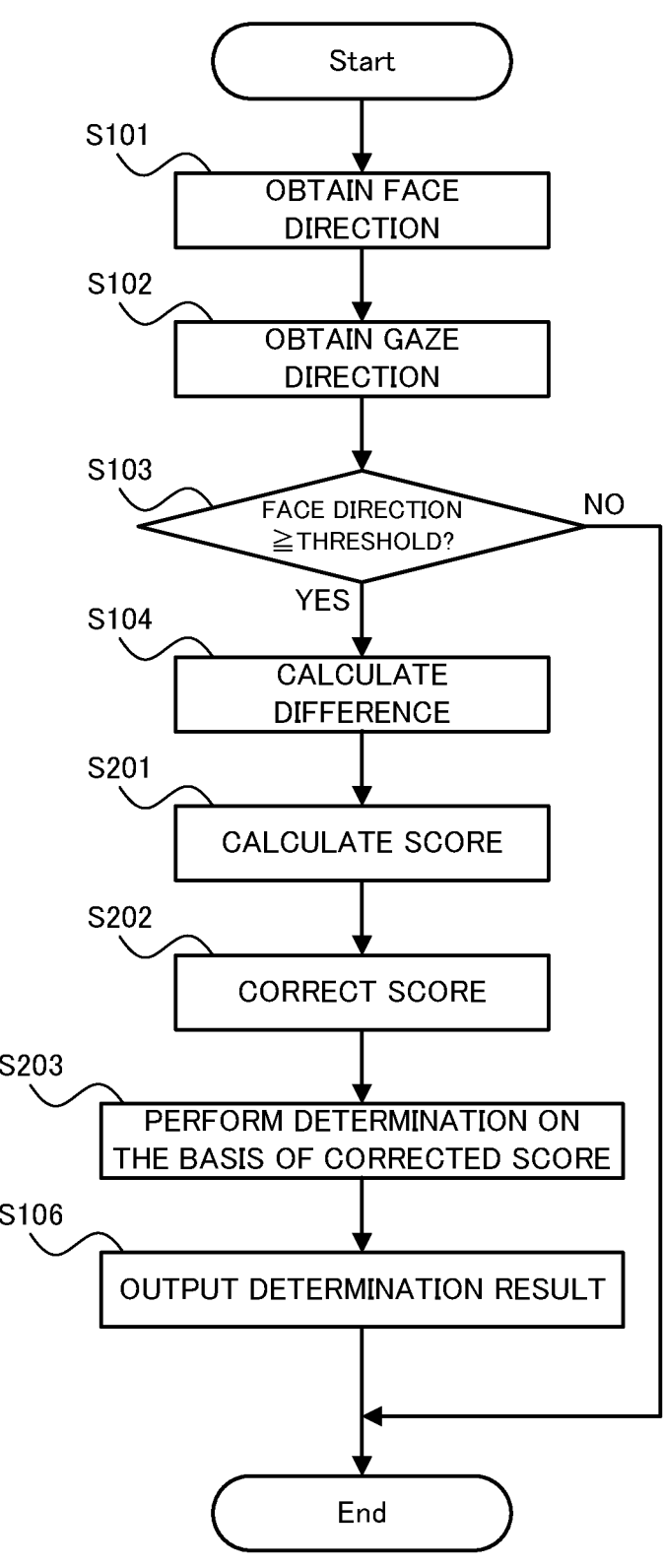
FIG. 5 is a flowchart illustrating a flow of operation of the information processing system according to the second example embodiment.

As illustrated in FIG. 5, in operation of the information processing system 10 according to the second example embodiment, first, the face direction acquisition unit 110 obtains the face direction of the user (step S101). In addition, the gaze direction acquisition unit 120 obtains the gaze direction of the user (step S102).

Subsequently, the threshold determination unit 131 determines whether or not the angle of the face direction of the user obtained by the face direction acquisition unit 110 is greater than or equal to the predetermined threshold (step S103). When it is determined that the angle of the face direction of the user is not greater than or equal to the predetermined threshold (step S103: NO), the subsequent process is omitted and a series of processing steps is ended. On the other hand, when it is determined that the angle of the face direction of the user is greater than or equal to the predetermined threshold (step S103: YES), the difference calculation unit 132 calculates the difference between the face direction of the user and the gaze direction (step S104).

Subsequently, the score calculation unit 133 calculates the score from the difference between the face direction and the gaze direction of the user (step S201). Then, the score correction unit 134 corrects the score in accordance with the angle of the face direction of the user (step S202). Then, the determination processing unit 135 determines whether or not the user is a living body, on the basis of the corrected score (step S203). Then, the output unit 140 outputs the determination result of the determination unit 130 (step S106).

(Technical Effect)

Next, a technical effect obtained by the information processing system 10 according to the second example embodiment will be described.

As described in FIG. 4, in the information processing system 10 according to the second example embodiment, the score calculated from the difference between the face direction and the gaze direction is corrected in accordance with the angle of the face direction, and it is determined whether or not the user is a living body on the basis of the corrected score. In this way, it is possible to determine whether or not the user is a living body with higher accuracy than that when the score is not corrected.

Third Example Embodiment

The information processing system 10 according to a third example embodiment will be described with reference to FIG. 6 and FIG. 7. The third example embodiment describes a specific correction example of the second example embodiment, and may be the same as the first and second example embodiments in the other configuration and operation. For this reason, a part that is different from each of the example embodiments described above will be described in detail below, and a description of other overlapping parts will be omitted as appropriate.

(Score Before Corrected)

First, the score calculated by the information processing system 10 according to the third example embodiment will be specifically described with reference to FIG. 6. FIG. 6 is a graph illustrating a distribution example of the score calculated by an information processing system according to the third example embodiment.

Figure 6:
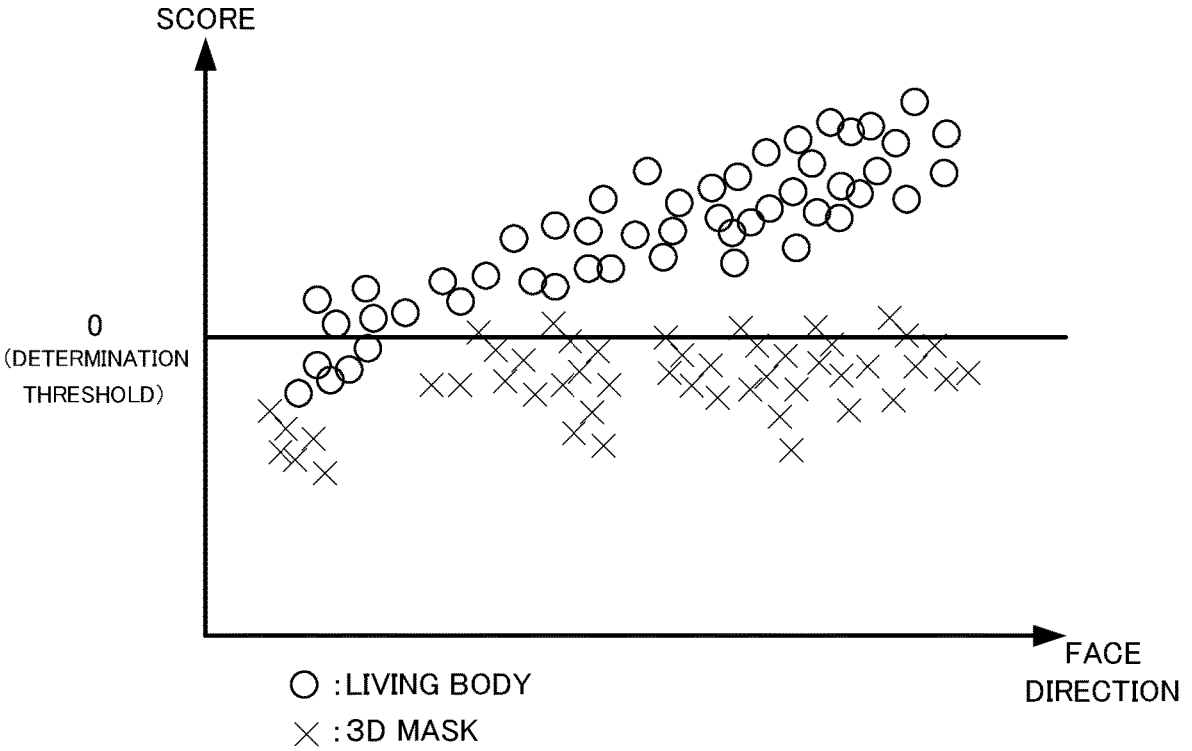
FIG. 6 is a graph illustrating a distribution example of a score calculated by an information processing system according to a third example embodiment.

As illustrated in FIG. 6, in the information processing system 10 according to the third example embodiment, the calculation is performed such that the score of a living body has a positive value, and the score of a 3D mask (i.e., spoofing) has a negative value. As the angle of the face direction of the user is larger, the score tends to have a higher value. Therefore, as can be seen from the drawing, when the angle of the face direction is relatively small, the score may have a negative score even when the user is a living body. In addition, due to estimation errors of the face direction and the gaze direction, the score may have a positive value even when the user is not a living body. If such a score is used as it is for the determination (e.g., when the determination is performed by using a determination threshold of "0"), there is a possibility that an erroneous determination result comes out. In order to prevent such an erroneous determination, the score is corrected in accordance with the angle of the face direction in the information processing system 10 according to the third example embodiment.

(Score after Corrected)

Figure 7:
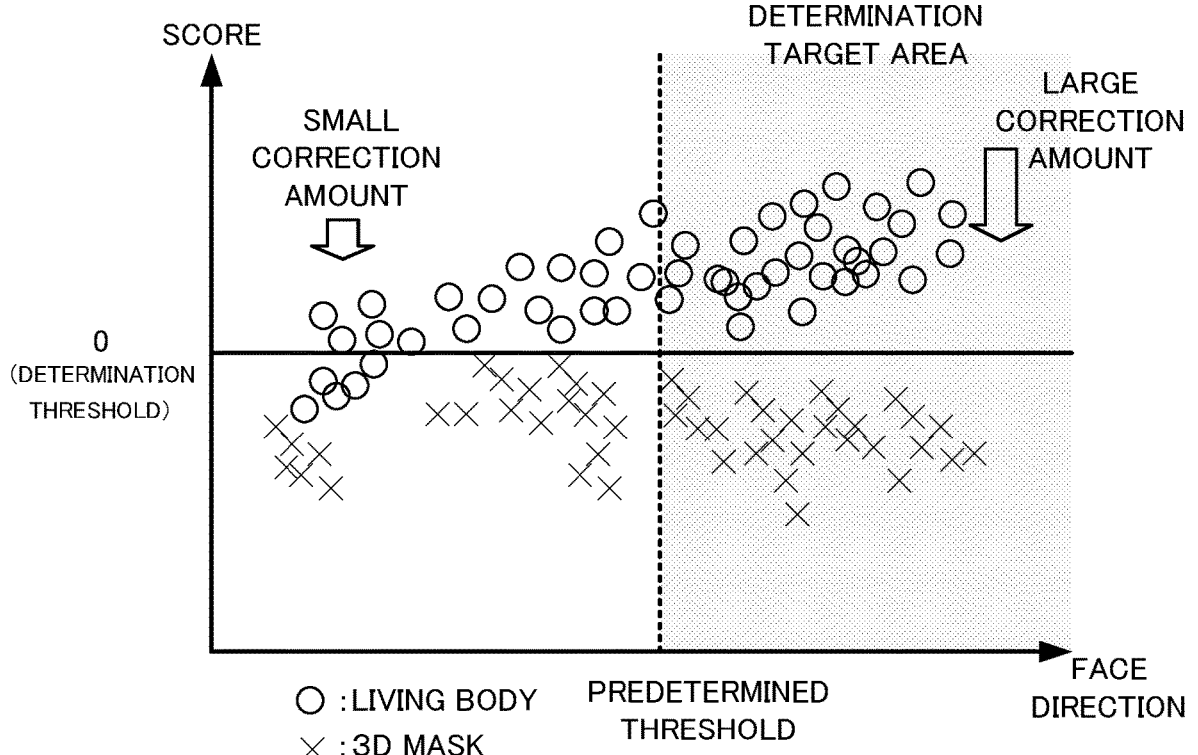
FIG. 7 is a graph illustrating an example of a correction method of correcting the score in the information processing system according to the third example embodiment.

Next, with reference to FIG. 7, the correction of the score in the information processing system 10 according to the third example embodiment will be specifically described. FIG. 7 is a graph illustrating an example of the correction method of correcting the score in the information processing system according to the third example embodiment.

As illustrated in FIG. 7, in the information processing system 10 according to the third example embodiment, the correction is performed such that a larger correction amount is subtracted from the score as the angle of the face direction is larger. Therefore, the score when the angle of the face direction is small is corrected to be slightly smaller, and the score when the angle of the face direction is large is corrected to be significantly smaller. Such a correction can be performed by using the following correction equation (1), for example.

$$\text{Score after corrected} = -A \times \text{face direction angle} + B \times \text{Score before corrected} + C, \quad (1),$$

wherein A, B, and C in the above equation are predetermined coefficients, and are assumed to be obtained in advance.

Looking at the score after corrected, all the scores have negative values when the user is not a living body. Therefore, it is possible to prevent that the user who is not a living body is erroneously determined to be a living body. On the other hand, the scores when the user is a living body have negative values in a part where the angle of the face direction is small, but have positive values in a determination target area in which the angle of the face direction is greater than or equal to the predetermined threshold (i.e., an area in which the determination is performed by the threshold determination unit 131). Therefore, it is possible to prevent that the user who is a living body is erroneously determined to be not a living body.

(Technical Effect)

Next, a technical effect obtained by the information processing system 10 according to the third example embodiment will be described.

As described in FIG. 6 and FIG. 7, in the information processing system 10 according to the third example embodiment, the correction is performed such that a larger correction amount is subtracted from the score (i.e., such that the score is smaller) as the angle of the face direction is larger. In this way, the calculated score is corrected to an appropriate value. Therefore, it is possible to determine whether or not the user is a living body with higher accuracy.

Fourth Example Embodiment

The information processing system 10 according to a fourth example embodiment will be described with reference to FIG. 8 and FIG. 9. The fourth example embodiment is partially different from the first to third example embodiments only in the configuration and operation, and may be the same as the first to third example embodiments in the other parts. For this reason, a description of a part that overlaps each of the example embodiments described above will be omitted below as appropriate.

(Functional Configuration)

First, a functional configuration of the information processing system 10 according to the fourth example embodiment will be described with reference to FIG. 8. FIG. 8 is a block diagram illustrating the functional configuration of the information processing system according to the fourth example embodiment. In FIG. 8, the same components as those illustrated in FIG. 2 and FIG. 4 carry the same reference numerals.

Figure 8:
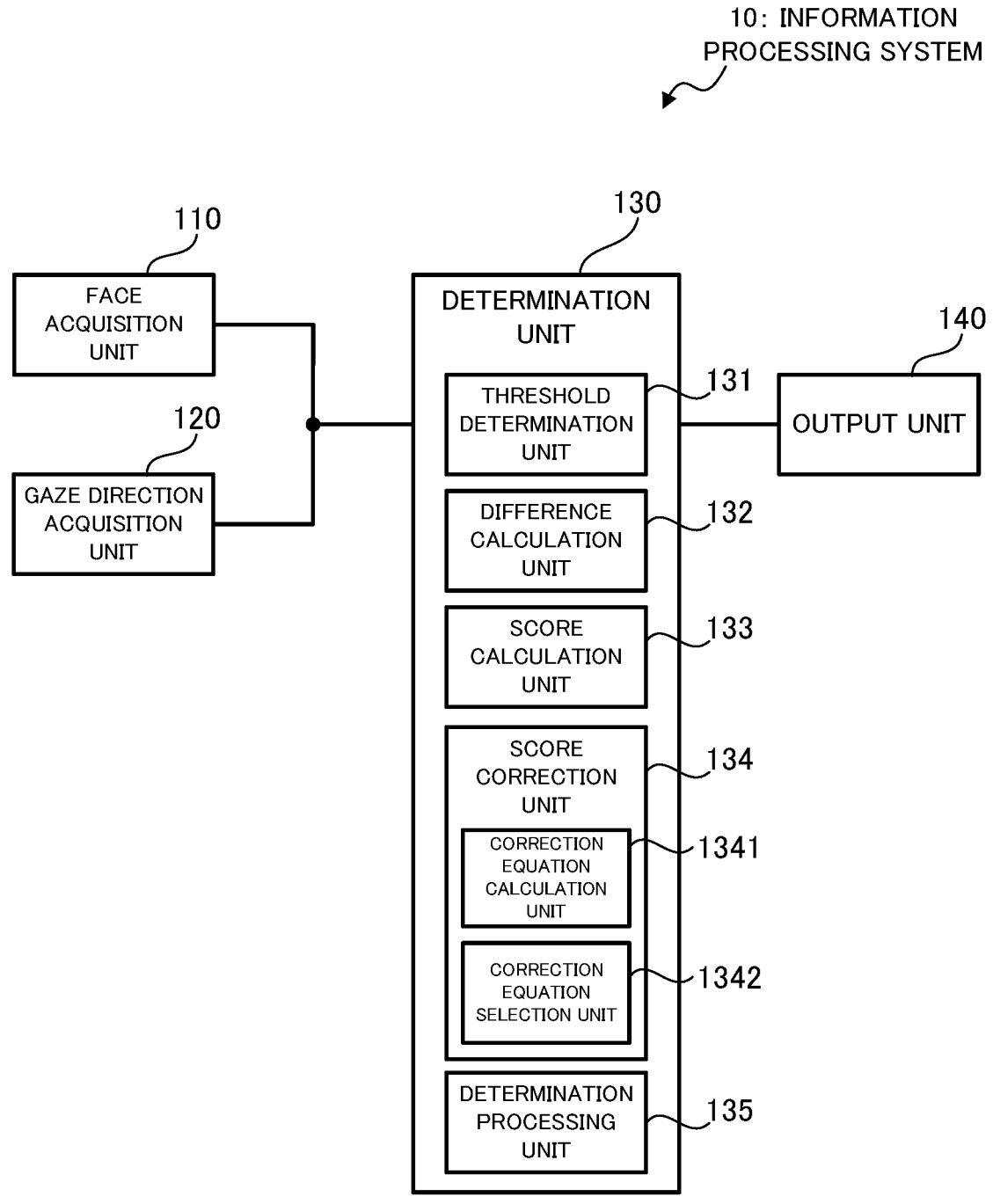
FIG. 8 is a block diagram illustrating a functional configuration of an information processing system according to a fourth example embodiment.

As illustrated in FIG. 8, the information processing system 10 according to the fourth example embodiment includes, as processing blocks for realizing the functions thereof, the face direction acquisition unit 110, the gaze direction acquisition unit 120, the determination unit 130, and the output unit 140. Especially, in the determination unit 130 according to the second example embodiment, the score correction unit 134 includes a correction equation storage unit 1341 and a correction equation selection unit 1342.

The correction equation storage unit 1341 stores a plurality of correction equations for correcting the score. The correction equation storage unit 1341 may store a plurality of correction equations, such as the equation (1), with different coefficients, for example.

The correction equation selection unit 1342 is configured to select one correction equation to be used to correct the score, from among the plurality of correction equations stored in the correction equation storage unit 1341. The correction equation selection unit 1342 selects the correction equation in accordance with information about the user. The "information about the user" is information associated with the user, and is information indicating characteristics, attributes, and conditions of the user, for example. The information about the user may be, for example, information including a numerical value such as the position of eyes (e.g., how far the eyes are away), or may be information indicating the tendency of facial features (e.g., information about a race). The information about the user may be information including the gender of the user, the size of the face, or the like. The information about the user may be obtained from the image of the user, or from other means (e.g., an input by the user, pre-registration information, etc.).

(Flow of Operation)

Next, a flow of operation of the information processing system 10 according to the fourth example embodiment will be described with reference to FIG. 9. FIG. 9 is a flowchart illustrating the flow of the operation of the information processing system according to the fourth example embodiment. In FIG. 9, the same steps as those illustrated in FIG. 3 and FIG. 5 carry the same reference numerals.

Figure 9:
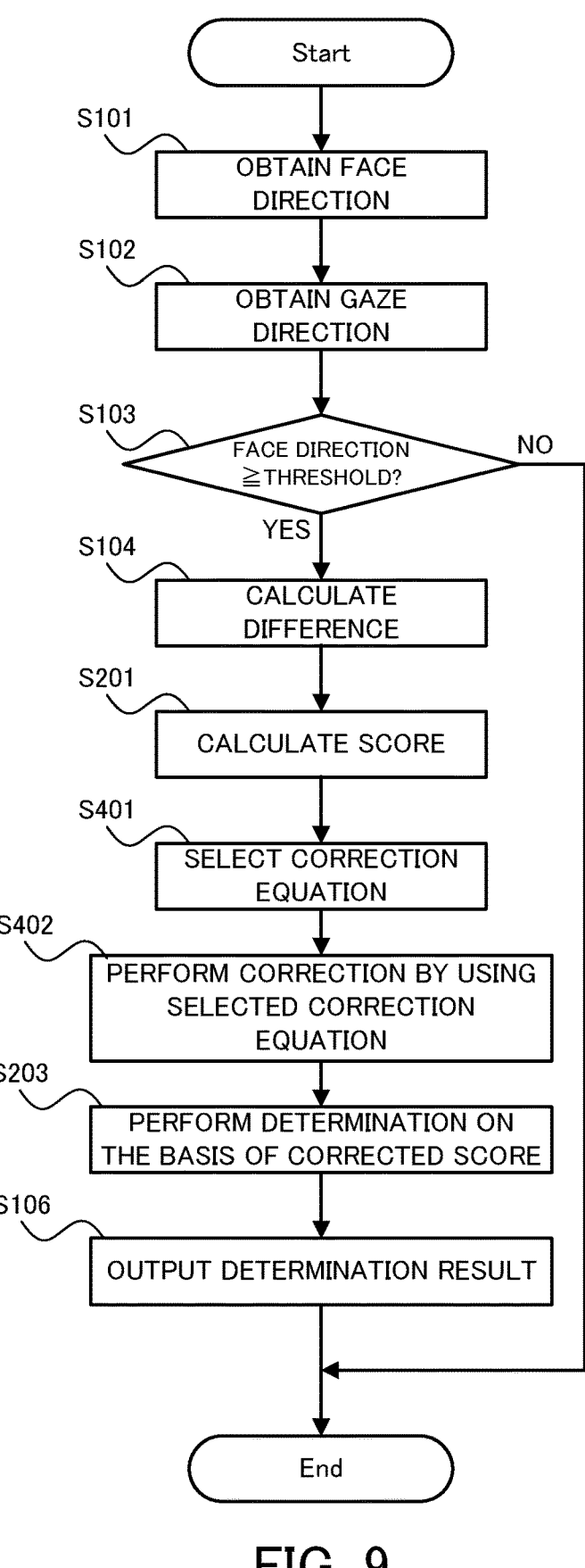
FIG. 9 is a flowchart illustrating a flow of operation of the information processing system according to the fourth example embodiment.

As illustrated in FIG. 9, in operation of the information processing system 10 according to the fourth example embodiment, first, the face direction acquisition unit 110 obtains the face direction of the user (step S101). In addition, the gaze direction acquisition unit 120 obtains the gaze direction of the user (step S102).

Subsequently, the threshold determination unit 131 determines whether or not the angle of the face direction of the user obtained by the face direction acquisition unit 110 is greater than or equal to the predetermined threshold (step S103). When it is determined that the angle of the face direction of the user is not greater than or equal to the predetermined threshold (step S103: NO), the subsequent process is omitted and a series of processing steps is ended. On the other hand, when it is determined that the angle of the face direction of the user is greater than or equal to the predetermined threshold (step S103: YES), the difference calculation unit 132 calculates the difference between the face direction of the user and the gaze direction (step S104).

Subsequently, the score calculation unit 133 calculates the score from the difference between the face direction and the gaze direction of the user (step S201). Especially in the fourth example embodiment, the correction expression selection unit 1342 selects one correction equation to be used to correct the score, from among the plurality of correction equations stored in the correction equation storage unit 1341 (step S401). Then, the score correction unit 134 corrects the score by using the correction equation selected by the correction equation selection unit 1342 (step S402).

Subsequently, the determination processing unit 135 determines whether or not the user is a living body, on the basis of the corrected score (step S203). Then, the output unit 140 outputs the determination result of the determination unit 130 (step S106).

(Technical Effect)

Next, a technical effect obtained by the information processing system 10 according to the fourth example embodiment will be described.

As described in FIG. 8 and FIG. 9, in the information processing system 10 according to the fourth example embodiment, the score correction unit stores a plurality of correction equations, and selects the correction equation in accordance with the user (i.e., properly uses the correction equation), thereby to correct the score. In this way, it is possible to correct the score to a more appropriate value than a value when the correction is always performed in the same manner. Consequently, it is possible to determine whether or not the user is a living body with higher accuracy.

Fifth Example Embodiment

The information processing system 10 according to a fifth example embodiment will be described with reference to FIG. 10 to 12. The fifth example embodiment is partially different from the first to fourth example embodiments only in the configuration and operation, and may be the same as the first to fourth example embodiments in the other parts. For this reason, a part that is different from each of the example embodiments described above will be described in detail below, and a description of other overlapping parts will be omitted as appropriate.

(Functional Configuration)

First, a functional configuration of the information processing system 10 according to the fifth example embodiment will be described with reference to FIG. 10. FIG. 10 is a block diagram illustrating the functional configuration of the information processing system according to the fifth example embodiment. In FIG. 10, the same components as those illustrated in FIG. 4 carry the same reference numerals.

Figure 10:
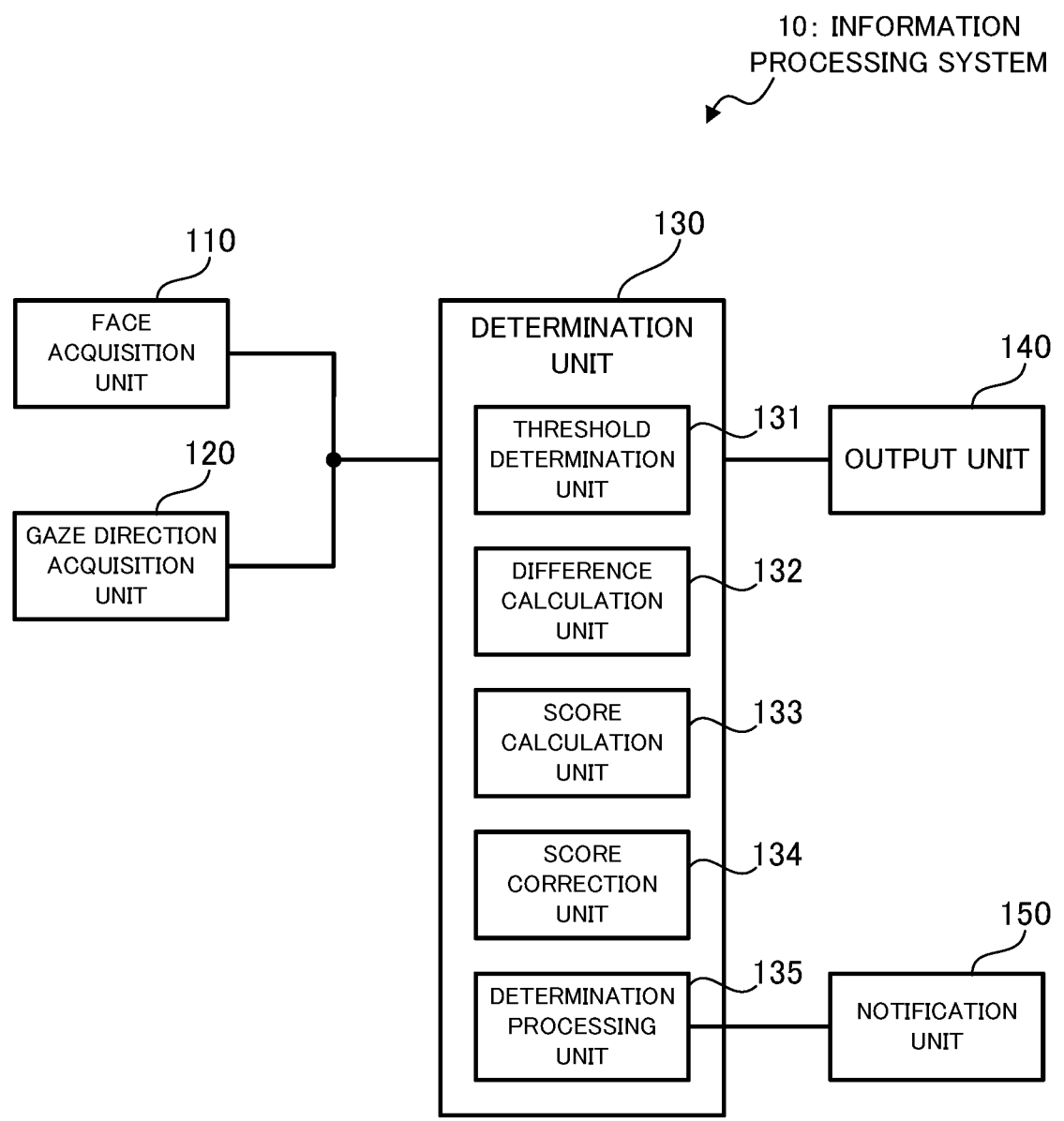
FIG. 10 is a block diagram illustrating a functional configuration of an information processing system according to a fifth example embodiment.

As illustrated in FIG. 10, the information processing system 10 according to the fifth example embodiment includes, as processing blocks for realizing the functions thereof, the face direction acquisition unit 110, the gaze direction acquisition unit 120, the determination unit 130, the output unit 140, and a notification unit 150. That is, the information processing system 10 according to the fifth example embodiment further includes the notification unit 150, in addition to the configuration in the second example embodiment (see FIG. 4).

The notification unit 150 is configured to provide a notification in accordance with the determination result of the determination processing unit 135. More specifically, the notification unit 150 is configured to provide a notification of a change in the determination result, when the determination result of the determination processing unit 135 is changed before and after the score is corrected. The determination processing unit 135 according to the fifth example embodiment is configured to perform not only a determination based on the corrected score, but also a determination based on the score before corrected (hereinafter referred to as a "tentative determination" as appropriate).

(Flow of Operation)

Next, a flow of operation of the information processing system 10 according to the fifth example embodiment will be described with reference to FIG. 11. FIG. 11 is a flowchart illustrating the flow of the operation of the information processing system according to the fifth example embodiment. In FIG. 11, the same steps as those illustrated in FIG. 5 carry the same reference numerals.

Figure 11:
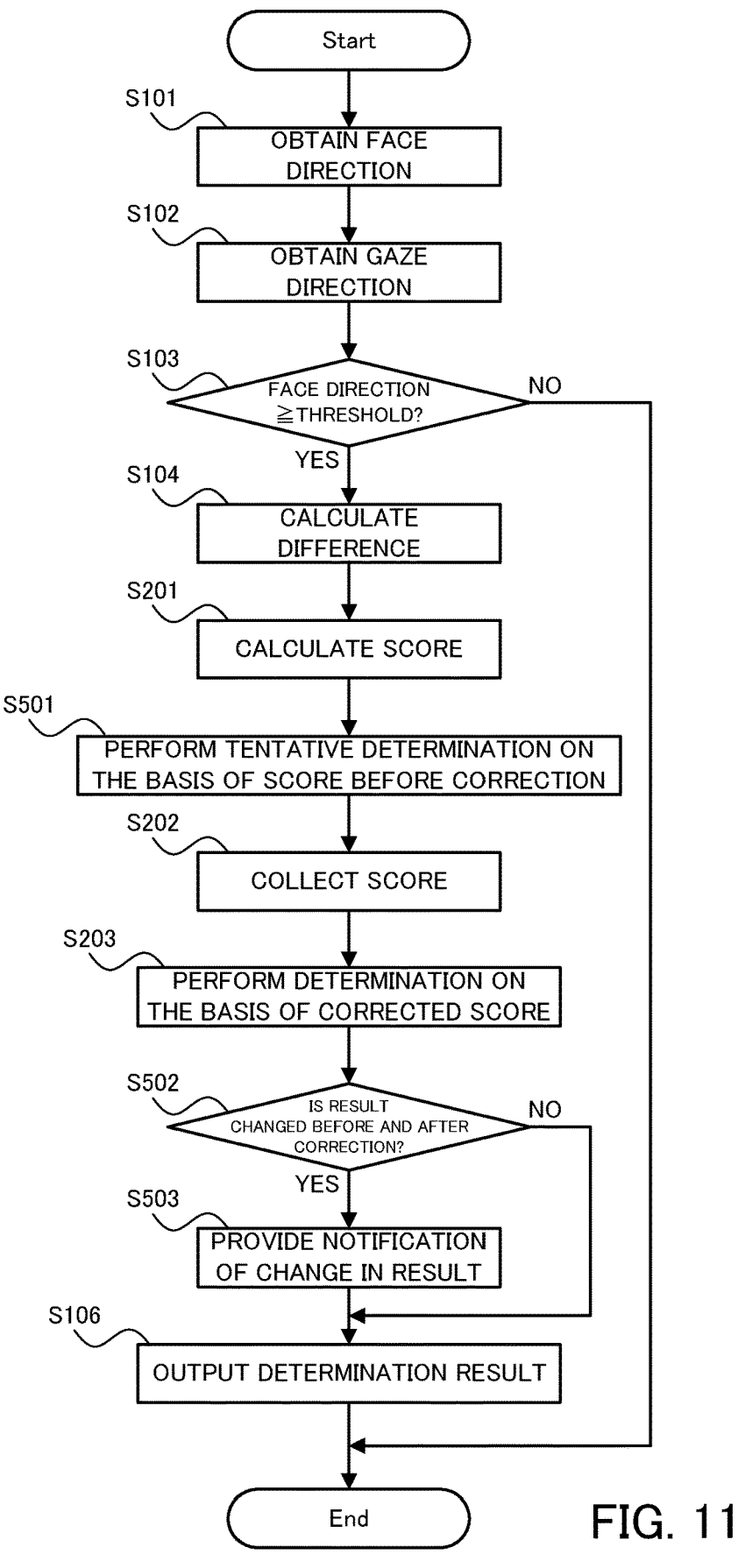
FIG. 11 is a flowchart illustrating a flow of operation of the information processing system according to the fifth example embodiment.

As illustrated in FIG. 11, in operation of the information processing system 10 according to the fifth example embodiment, first, the face direction acquisition unit 110 obtains the face direction of the user (step S101). In addition, the gaze direction acquisition unit 120 obtains the gaze direction of the user (step S102).

Subsequently, the threshold determination unit 131 determines whether or not the angle of the face direction of the user obtained by the face direction acquisition unit 110 is greater than or equal to the predetermined threshold (step S103). When it is determined that the angle of the face direction of the user is not greater than or equal to the predetermined threshold (step S103: NO), the subsequent process is omitted and a series of processing steps is ended. On the other hand, when it is determined that the angle of the face direction of the user is greater than or equal to the predetermined threshold (step S103: YES), the difference calculation unit 132 calculates the difference between the face direction of the user and the gaze direction (step S104).

Subsequently, the score calculation unit 133 calculates the score from the difference between the face direction and the gaze direction of the user (step S201). Especially in the fifth example embodiment, the determination processing unit 135 performs the tentative determination of whether or not the user is a living body, on the basis of the score before corrected (step S501). Then, the score correction unit 134 corrects the score in accordance with the angle of the face direction of the user (step S202). Then, the determination processing unit 135 determines whether or not the user is a living body, on the basis of the corrected score (step S203).

Subsequently, the notification unit 150 determines whether or not the determination result of the determination processing unit 135 is changed before and after the score is corrected (step S502). When it is determined that the determination result is changed before and after the score is corrected (step S502: YES), the notification unit 150 notifies the change in the determination result by the correction (step S503). Then, the output unit 140 outputs the determination result of the determination unit 130 (step S106).

The notification by the notification unit 150 may be provided together with the output by the output unit 140. For example, the notification by the notification unit 150 and the output by the output unit 140 may be performed by using a common display, for example. Furthermore, the notification by the notification unit 150 may be provided to the user, or to a system administrator or manager, or the like.

(Display Example)

Next, a display example in the information processing system 10 according to the fifth example embodiment (specifically, a display example reflecting the notification by the notification unit 150) will be described with reference to FIG. 12. FIG. 12 is a diagram illustrating the display example by the information processing system according to the fifth example embodiment.

Figure 12:
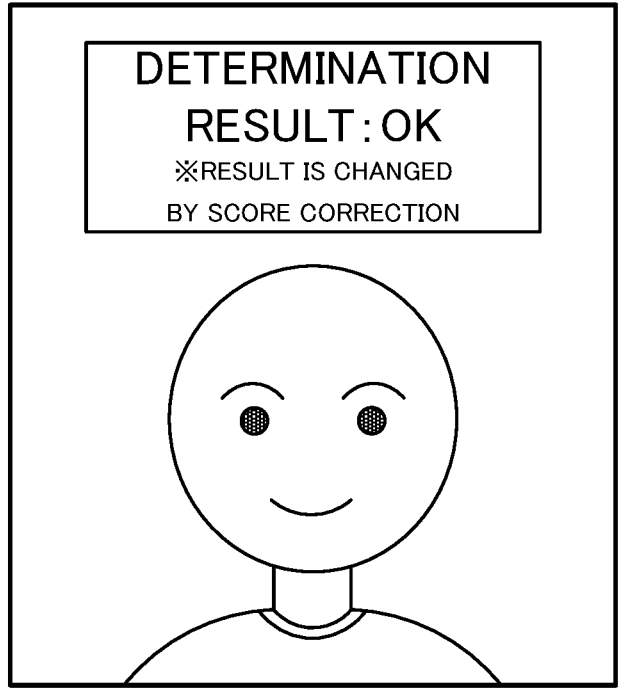
FIG. 12 is a diagram illustrating a display example by the information processing system according to the fifth example embodiment.

As illustrated in FIG. 12, in the information processing system 10 according to the fifth example embodiment, the determination result by the determination unit 130 (i.e., the output by the output unit 140) may be displayed together with the face image of the user. In this case, the determination result of the user is outputted as "OK" (i.e., being a living body). Especially in the fifth example embodiment, in addition to the determination result, the notification by the notification unit 150 may be displayed. Here, a message "Result is changed by score correction" is displayed under the determination result. Instead of such a message, for example, a message indicating low reliability, or a message prompting a retry of the determination may be displayed.
(Technical Effect)

Next, a technical effect obtained by the information processing system 10 according to the fifth example embodiment will be described.

As described in FIG. 10 to FIG. 12, in the information processing system 10 according to the fifth example embodiment, when the determination result of whether or not the user is a living body is changed before and after the score is corrected, the process of notifying that is performed. In this way, since the notification will be provided in a situation where the original score is in the vicinity of the determination threshold, it is possible to know that the determination of this time is difficult (in other words, the reliability of the determination may be low), for example.

Sixth Example Embodiment

The information processing system 10 according to a sixth example embodiment will be described with reference to FIG. 13 and FIG. 14. The sixth example embodiment is partially different from the first to fifth example embodiments only in the configuration and operation, and may be the same as the first to fifth example embodiments in the other parts. For this reason, a part that is different from each of the example embodiments described above will be described in detail below, and a description of other overlapping parts will be omitted as appropriate.
(Acquisition of Face Direction and Gaze Direction)

First, a method of obtaining the face direction and the front direction in the information processing system 10 according to the sixth example embodiment will be specifically described with reference to FIG. 13. FIG. 13 is a graph illustrating an acquisition timing of the face direction and the gaze direction by the information processing system according to the sixth example embodiment.

As illustrated in FIG. 13, in the information processing system 10 according to the sixth example embodiment, the face direction and the gaze direction of the user are obtained during an operation in which the user shakes the head from side to side (i.e., while repeating an operation of turning the head to the right and an operation of turning the head to the left). More specifically, a plurality of images are captured during an operation in which the user shakes the head, and the face direction and the gaze direction of the user are obtained (estimated) from the images.

The face direction and the gaze direction of the user are obtained at the timing (P1, P2, P3, and P4 in the figure) when the angle of the face direction of the user is at a peak. In this case, the face direction and the gaze direction of the user are obtained four times in total, which are two times at the peak in the right direction and two times at the peak in the left direction. The number of acquisitions here is an example, and the face direction and the gaze direction of the user may be obtained four or more times, for example.
(Score Calculation Example)

Next, a method of calculating the score in the information processing system 10 according to the sixth example embodiment will be specifically described with reference to FIG. 14. FIG. 14 is a conceptual diagram illustrating the method of calculating the score by the information processing system according to the sixth example embodiment.

As illustrated in FIG. 14, in the information processing system 10 according to the sixth example embodiment, a plurality of differences are calculated from the face directions and the gaze directions obtained at a plurality of timings. Therefore, as illustrated in FIG. 13, when the face direction and the gaze direction of the user are obtained four times at P1, P2, P3, and P4, the differences are calculated as those including four values corresponding to P1, P2, P3, and P4 (e.g., four-dimensional vector). The differences calculated in this manner are inputted into the score calculation unit 133, and the score is calculated as the output thereof. The score calculation unit 133 in this case may be configured as a learned SVM (Support Vector Machine), for example.
(Technical Effect)

Next, a technical effect obtained by the information processing system 10 according to the sixth example embodiment will be described.

As described in FIG. 13 and FIG. 14, in the information processing system 10 according to the sixth example embodiment, the facial direction and the gaze direction are obtained from at a plurality of timings, from a plurality of images captured during the operation in which the user shakes the head. In this way, it is possible to determine whether or not the user is a living body with higher accuracy than that when the face direction and the gaze direction are obtained only once.

Seventh Example Embodiment

The information processing system 10 according to a seventh example embodiment will be described with reference to FIG. 15 to FIG. 18. The seventh example embodiment is partially different from the sixth example embodiment only in the operation, and may be the same as the first to sixth example embodiments in the other parts. For this reason, a part that is different from each of the example embodiments described above will be described in detail below, and a description of other overlapping parts will be omitted as appropriate.
(Functional Configuration)

First, a functional configuration of the information processing system 10 according to the seventh example embodiment will be described with reference to FIG. 15. FIG. 15 is a block diagram illustrating the functional configuration of the information processing system according to the seventh example embodiment. In FIG. 15, the same components as those illustrated in FIG. 2 carry the same reference numerals.

As illustrated in FIG. 15, the information processing system 10 according to the seventh example embodiment includes, as processing blocks for realizing the functions thereof, the face direction acquisition unit 110, the gaze direction acquisition unit 120, the determination unit 130, the output unit 140, and a shaking instruction unit 160. That is, the information processing system 10 according to the seventh example embodiment further includes the shaking instruction unit 160, in addition to the configuration in the first example embodiment (see FIG. 2). The determination unit 130 according to the seventh example embodiment includes a shaking determination unit 136, in addition to the threshold determination unit 131 and the difference calculation unit 132.

The shaking determination unit 136 is configured to determine whether or not the shaking when the face direction and the gaze direction of the user are obtained (Sixth example embodiment: see FIG. 13) is properly performed. The shaking determination unit 136 may determine whether the shaking is appropriate, for example, from whether the user shakes the head sufficiently greatly (e.g., whether or not the peak of the angle of the face direction exceeds a predetermined angle), or from whether the user turns the head in an appropriate direction (e.g., whether the user turns the head in another direction (e.g., downward) at the timing when the user should turn the head to the right).

The shaking instruction unit 160 is configured to output to the user an instruction to properly shake the head, when it is determined by the shaking determination unit 136 that the user does not properly shake the head. The instruction by the shaking instruction unit 160 may be provided together with the output by the output unit 140. For example, the instruction by the shaking instruction unit 160 and the output by the output unit 140 may be provided by using a common display, for example. When the user shakes the head a plurality of times, the instruction may be outputted only for a part of the actions. For example, when only the face direction obtained at P3 out of P1, P2, P3, and P4 illustrated in FIG. 14 is not appropriate (e.g., when the angle is sufficient at P1, P2, and P4, but the angle is small only at P3), the shaking instruction unit 160 may output only an instruction for the shaking operation corresponding to P3. Specifically, an instruction may be outputted to shake the head more greatly in a direction corresponding to the action at P3.

(Flow of Operation)

Next, a flow of operation of the information processing system 10 according to the seventh example embodiment will be described with reference to FIG. 16. FIG. 16 is a flowchart illustrating the flow of the operation of the information processing system according to the seventh example embodiment. In FIG. 16, the same steps as those illustrated in FIG. 3 carry the same reference numerals.

As illustrated in FIG. 16, in operation of the information processing system 10 according to the seventh example embodiment, first, the face direction acquisition unit 110 obtains the face direction of the user (step S101). In addition, the gaze direction acquisition unit 120 obtains the gaze direction of the user (step S102).

Subsequently, the shaking determination unit 136 determines whether or not the user properly shakes the head (step S701). When it is determined that the user does not properly shake the head (step S701: NO), the shaking instruction unit 160 outputs an instruction to properly shake the head, to the user. Then, the steps S101 and S102 (i.e., the acquisition of the face direction and the gaze direction) are performed again.

On the other hand, when it is determined that the user properly shakes the head (step S701: YES), the threshold determination unit 131 determines whether or not the angle of the face direction of the user obtained by the face direction acquisition unit 110 is greater than or equal to the predetermined threshold (step S103). When it is determined that the angle of the face direction of the user is not greater than or equal to the predetermined threshold (step S103: NO), the subsequent process is omitted and a series of processing steps is ended. On the other hand, when it is determined that the angle of the face direction of the user is greater than or equal to the predetermined threshold (step S103: YES), the difference calculation unit 132 calculates the difference between the face direction of the user and the gaze direction (step S104).

Subsequently, the determination unit 130 determines whether or not the user is a living body, on the basis of the difference between the face direction of the user and the gaze direction (step S105). Then, the output unit 140 outputs the determination result of the determination unit 130 (step S106).

(Display Example)

Next, with reference to FIG. 17 and FIG. 18, a display example in the information processing system 10 according to the seventh example embodiment (specifically, a display example reflecting the instruction by the shaking instruction unit 160) will be described. FIG. 17 is version 1 of a diagram illustrating a display example by the information processing system according to the seventh example embodiment. FIG. 18 is version 2 of a diagram illustrating a display example by the information processing system according to the seventh example embodiment.

As illustrated in FIG. 17, in the information processing system 10 according to the seventh example embodiment, a message prompting the user to turn the head more greatly may be displayed with the image of the user. For example, as in the example in FIG. 17, a message "Please turn the head a little more" may be displayed. In this way, it is expected that the user turns the head greatly, and as a consequence, it is possible to obtain the face direction and the gaze direction of the user, in a condition where the angle of the face direction is sufficiently large.

As illustrated in FIG. 18, in the information processing system 10 according to the seventh example embodiment, a message indicating a direction in which the user should turn the head greatly may be displayed with the image of the user. For example, as in the example in FIG. 18, a message "Please turn the head a little more to the left" may be displayed. In this way, for example, when the shaking to the right is sufficiently large, but the shaking to the left is insufficient, it is possible to provide an accurate instruction to the user.

(Technical Effect)

Next, a technical effect obtained by the information processing system 10 according to the seventh example embodiment will be described.

As described in FIG. 15 to FIG. 18, in the information processing system 10 according to the seventh example embodiment, when the shaking of the head of the user is inappropriate, an instruction is outputted to the user to shake the head properly. In this way, the user may be caused to shake the head properly and the face direction and the gaze direction of the user may be properly obtained, and thus, it is possible to determine whether or not the user is a living body with higher accuracy.

Eighth Example Embodiment

The information processing system 10 according to an eighth example embodiment will be described with reference to FIG. 19 and FIG. 20. The information processing system 10 according to the eighth example embodiment is partially different from the first to seventh example embodiments only in the operation, and may be the same as the first to seventh example embodiments in the other parts. For this reason, a part that is different from each of the example embodiments described above will be described in detail below, and a description of other overlapping parts will be omitted as appropriate.

(Functional Configuration)

First, a functional configuration of the information processing system 10 according to the eighth example embodiment will be described with reference to FIG. 19. FIG. 19 is a block diagram illustrating the functional configuration of the information processing system according to the eighth example embodiment. In FIG. 19, the same components as those illustrated in FIG. 2 and FIG. 4 carry the same reference numerals.

As illustrated in FIG. 19, the information processing system 10 according to the eighth example embodiment includes, as processing blocks for realizing the functions thereof, the face direction acquisition unit 110, the gaze direction acquisition unit 120, the determination unit 130, and the output unit 140. In particular, the determination unit 130 according to the eighth example embodiment includes the difference calculation unit 132, the score calculation unit 133, the score correction unit 134, and the determination processing unit 135.

The information processing system 10 according to the eighth example embodiment does not include the threshold determination unit 131, unlike in the first to seventh example embodiments described above. Therefore, regardless of whether or not the angle of the face direction of the user is greater than or equal to the predetermined threshold, the determination is performed by the determination unit 130. A specific operation of the determination unit 130 will be described in detail below.

(Flow of Operation)

Next, a flow of operation of the information processing system 10 according to the eighth example embodiment will be described with reference to FIG. 20. FIG. 20 is a flowchart illustrating the flow of the operation of the information processing system according to the eighth example embodiment. In FIG. 20, the same steps as those illustrated in FIG. 3 and FIG. 5 carry the same reference numerals.

As illustrated in FIG. 20, in operation of the information processing system 10 according to the eighth example embodiment, first, the face direction acquisition unit 110 obtains the face direction of the user (step S801). In addition, the gaze direction acquisition unit 120 obtains the gaze direction of the user (step S802).

Subsequently, the difference calculation unit 132 calculates the difference between the face direction and the gaze direction of the user (step S803). Then, the score calculation unit 133 calculates the score from the difference between the face direction and the gaze direction of the user (step S804). Then, the score correction unit 134 corrects the score in accordance with the angle of the face direction of the user (step S805).

Subsequently, the determination processing unit 135 determines whether or not the user is a living body, on the basis of the corrected score (step S806). Then, the output unit 140 outputs the determination result of the determination unit 130 (step S807).

(Technical Effect)

Next, a technical effect obtained by the information processing system 10 according to the eighth example embodiment will be described.

As described in FIG. 19 and FIG. 20, in the information processing system 10 according to the eighth example embodiment, the score calculated from the difference between the face direction and the gaze direction is corrected in accordance with the angle of the face direction, and it is determined whether or not the user is a living body on the basis of the corrected score. In this way, it is possible to determine whether or not the user is a living body with higher accuracy because the score is corrected to an appropriate value.

A process method in which a program for allowing the configuration in each of the example embodiments to operate to realize the functions of each example embodiment is recorded on a recording medium, and in which the program recorded on the recording medium is read as a code and executed on a computer, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and executes process alone, but also the program that operates on an OS and executes process in cooperation with the functions of expansion boards and another software, is also included in the scope of each of the example embodiments.

This disclosure is not limited to the examples described above and is allowed to be changed, if desired, without departing from the essence or spirit of this disclosure which can be read from the claims and the entire specification. An information processing system, an information processing method, and a recording medium with such changes are also intended to be within the technical scope of this disclosure.

<Supplementary Notes>

The example embodiments described above may be further described as, but not limited to, the following Supplementary Notes below.

(Supplementary Note 1)

An information processing system according to Supplementary Note 1 is an information processing system including: a face direction acquisition unit that obtains a face direction of a user; a gaze direction acquisition unit that obtains a gaze direction of the user; a determination unit that determines whether or not the user is a living body, on the basis of a difference between the face direction and the gaze direction, when an angle of the face direction is greater than or equal to a predetermined threshold; and an output unit that outputs a result of the determination.

(Supplementary Note 2)

An information processing system according to Supplementary Note 2 is the information processing system according to Supplementary Note 1, wherein the determination unit includes: a calculation unit that calculates a score indicating a possibility that the user is a living body, from the difference between the face direction and the gaze direction; a correction unit that corrects the score in accordance with the angle of the face direction; and a determination processing unit that determines whether or not the user is a living body, on the basis of the corrected score.

(Supplementary Note 3)

An information processing system according to Supplementary Note 3 is the information processing system according to Supplementary Note 2, wherein the correction unit corrects the score such that a larger correction amount is subtracted from the score as the angle of the face direction is larger.

(Supplementary Note 4)

An information processing system according to Supplementary Note 4 is the information processing system according to Supplementary Note 2 or 3, wherein the correction unit stores a plurality of correction equations for correcting the score, and selects the correction equation in accordance with information about the user, thereby to correct the score.

(Supplementary Note 5)

An information processing system according to Supplementary Note 5 is the information processing system according to any one of Supplementary Notes 2 to 4, wherein the determination processing unit determines whether or not the user is a living body on the basis of the corrected score, and determines whether or not the user is a living body on the basis of the score before corrected, and the information processing system further includes a notification unit that notifies a change in a determination result when the determination result of the determination processing unit is changed before and after correction.

(Supplementary Note 6)

An information processing system according to Supplementary Note 6 is the information processing system according to any one of Supplementary Notes 1 to 5, wherein the face direction acquisition unit and the gaze direction acquisition unit respectively obtain the face direction and the gaze direction at a plurality of timings, from a plurality of images captured during an action in which the user shakes the head to a side, and the determination unit determines whether or not the user is a living body, on the basis of differences between the face directions and the gaze directions at the plurality of timings.

(Supplementary Note 7)

An information processing system according to Supplementary Note 7 is the information processing system according to Supplementary Note 6, further including an instruction unit that instructs the user how to properly shake the head, when it is detected that the user does not properly shake the head.

(Supplementary Note 8)

An information processing system according to Supplementary Note 8 is an information processing system including: a face direction acquisition unit that obtains a face direction of a user; a gaze direction acquisition unit that obtains a gaze direction of the user; a calculation unit that calculates a score indicating a possibility that the user is a living body, from a difference between the face direction and the gaze direction; a correction unit that corrects the score in accordance with an angle of the face direction; a determination processing unit that determines whether or not the user is a living body, on the basis of the corrected score; and an output unit that outputs a result of the determination.

(Supplementary Note 9)

An information processing method according to Supplementary Note 9 is an information processing method including: obtaining a face direction of a user; obtaining a gaze direction of the user; determining whether or not the user is a living body, on the basis of a difference between the face direction and the gaze direction, when an angle of the face direction is greater than or equal to a predetermined threshold; and outputting a result of the determination.

(Supplementary Note 10)

A recording medium according to Supplementary Note 10 is a recording medium on which a computer program that allows a computer to execute an information processing method is recorded, the information processing method including: obtaining a face direction of a user; obtaining a gaze direction of the user; determining whether or not the user is a living body, on the basis of a difference between the face direction and the gaze direction, when an angle of the face direction is greater than or equal to a predetermined threshold; and outputting a result of the determination.

(Supplementary Note 11)

A computer program according to Supplementary Note 11 is a computer program that allows a computer to execute an information processing method, the information processing method including: obtaining a face direction of a user; obtaining a gaze direction of the user; determining whether or not the user is a living body, on the basis of a difference between the face direction and the gaze direction, when an angle of the face direction is greater than or equal to a predetermined threshold; and outputting a result of the determination.

DESCRIPTION OF REFERENCE CODES

10 Information processing system
11 Processor
16 Output apparatus
20 Camera
110 Face direction acquisition unit
120 Gaze direction acquisition unit
130 Determination unit
131 Threshold determination unit
132 Difference calculation unit
133 Score calculation unit
134 Score correction unit
1341 Correction equation storage unit
1342 Correction equation selection unit
135 Determination processing unit
136 Shaking determination unit
140 Output unit
150 Notification unit
160 Shaking instruction unit

What is claimed is:

1. An information processing system comprising: at least one memory that is configured to store instructions; and
    at least one processor that is configured to execute the instructions to obtain a face direction of a user;
    obtain a gaze direction of the user;
    calculate a difference between the face direction and the gaze direction based on an angle of the face direction being greater than or equal to a predetermined threshold;
    determine whether or not the user is a living body, based on the difference between the face direction and the gaze direction;
    output a result of the determination;
    calculate a score indicating a possibility that the user is a living body, from the difference between the face direction and the gaze direction;
    correct the score in accordance with the angle of the face direction; and
    determine whether or not the user is a living body, based on the corrected score.

2. The information processing system according to claim 1, wherein the at least one processor is configured to execute the instructions to correct the score such that a larger correction amount is subtracted from the score as the angle of the face direction is larger.

3. The information processing system according to claim 1, wherein the at least one processor is configured to execute the instructions to store a plurality of correction equations for correcting the score, and select the correction equation in accordance with information about the user, thereby to correct the score.

4. The information processing system according to claim 1, wherein the at least one processor is configured to execute the instructions to:

determine whether or not the user is a living body based on the corrected score, and determine whether or not the user is a living body based on the score before corrected, and notify a change in a determination result when the determination result is changed before and after correction.

5. The information processing system according to claim 1, wherein the at least one processor is configured to execute the instructions to:

obtain the face direction and the gaze direction at a plurality of timings, from a plurality of images captured during an action in which the user shakes the head to a side, and determine whether or not the user is a living body, based on differences between the face directions and the gaze directions at the plurality of timings.

6. The information processing system according to claim 5, wherein the at least one processor is configured to execute the instructions to instruct the user how to properly shake the head, when it is detected that the user does not properly shake the head.

7. An information processing method comprising: obtaining a face direction of a user;

obtaining a gaze direction of the user;

calculate a difference between the face direction and the gaze direction based on an angle of the face direction being greater than or equal to a predetermined threshold;

determining whether or not the user is a living body, based on the difference between the face direction and the gaze direction;

outputting a result of the determination;

calculating a score indicating a possibility that the user is a living body, from the difference between the face direction and the gaze direction;

correcting the score in accordance with the angle of the face direction; and determining whether or not the user is a living body, based on the corrected score.

8. A non-transitory recording medium on which a computer program that allows a computer to execute an information processing method is recorded, the information processing method including:

obtaining a face direction of a user; obtaining a gaze direction of the user;

calculate a difference between the face direction and the gaze direction based on an angle of the face direction being greater than or equal to a predetermined threshold;

determining whether or not the user is a living body, based on the difference between the face direction and the gaze direction;

outputting a result of the determination;

calculating a score indicating a possibility that the user is a living body, from the difference between the face direction and the gaze direction;

correcting the score in accordance with the angle of the face direction; and determining whether or not the user is a living body, based on the corrected score.

* * * * *